US012327295B2

(12) United States Patent
Kuznetsov et al.

(10) Patent No.: US 12,327,295 B2
(45) Date of Patent: Jun. 10, 2025

(54) METHODS, SYSTEMS, APPARATUS, AND ARTICLES OF MANUFACTURE TO PERFORM TIME ALIGNMENT FOR WATERMARKS

(71) Applicant: The Nielsen Company (US), LLC, New York, NY (US)

(72) Inventors: Vladimir Kuznetsov, Ellicott City, MD (US); Wendell D. Lynch, East Lansing, MI (US)

(73) Assignee: The Nielsen Company (US), LLC, New York, NY (US)

( * ) Notice: Subject to any disclaimer, the term of this patent is extended or adjusted under 35 U.S.C. 154(b) by 337 days.

(21) Appl. No.: 17/967,589

(22) Filed: Oct. 17, 2022

(65) Prior Publication Data

US 2023/0206377 A1 Jun. 29, 2023

Related U.S. Application Data

(60) Provisional application No. 63/294,782, filed on Dec. 29, 2021.

(51) Int. Cl.
*G06T 1/00* (2006.01)
(52) U.S. Cl.
CPC ...... *G06T 1/0078* (2013.01); *G06T 2201/005* (2013.01)

(58) Field of Classification Search
None
See application file for complete search history.

(56) References Cited

U.S. PATENT DOCUMENTS 5,481,294 A 1/1996 Thomas et al.
2019/0295560 A1* 9/2019 Christian .............. G10L 19/018

OTHER PUBLICATIONS

Kirovski et al., "Spread-Spectrum Watermarking of Audio Signals," IEEE, IEEE Transactions on Signal Processing, vol. 51, No. 4, Apr. 2003, pp. 1020-1033.

* cited by examiner

*Primary Examiner* — Lennin R Rodriguezgonzalez

(57) ABSTRACT

Methods, apparatus, systems, and articles of manufacture are disclosed to perform time alignment for watermarks. An example apparatus adjusts a power value of an element of a template based on respective average magnitudes and respective tonality ratios corresponding to a plurality of frequency representations of a media signal, the media signal to be encoded with at least one watermark, the element corresponding to one of the plurality of frequency representations. Additionally, the example apparatus computes an alignment of the template to the media signal based on respective power values of elements of the template, the template corresponding to a type of the at least one watermark. The example apparatus also encodes the media signal with the at least one watermark according to the alignment.

21 Claims, 10 Drawing Sheets

METHODS, SYSTEMS, APPARATUS, AND ARTICLES OF MANUFACTURE TO PERFORM TIME ALIGNMENT FOR WATERMARKS

RELATED APPLICATION

This patent claims the benefit of U.S. Provisional Patent Application No. 63/294,782, which was filed on Dec. 29, 2021. U.S. Provisional Patent Application No. 63/294,782 is hereby incorporated herein by reference in its entirety. Priority to U.S. Provisional Patent Application No. 63/294,782 is hereby claimed.

FIELD OF THE DISCLOSURE

This disclosure relates generally to audience measurement and, more particularly, to methods, systems, apparatus, and articles of manufacture to perform time alignment for watermarks.

BACKGROUND

Media monitoring companies, such as audience measurement entities (AMEs), monitor user interaction with media devices, such as smartphones, tablets, laptops, smart televisions, etc., and/or other metrics associated with media. To facilitate such monitoring, the media monitoring companies enlist panelists and install meters at the media presentation locations of those panelists. Panelists may also be provided with portable meters that they can wear on their person. The meters monitor media presentations and transmit media monitoring information to a central facility of the media monitoring company. Such media monitoring information enables the media monitoring companies to, among other things, monitor exposure to advertisements, determine advertisement effectiveness, determine user behavior, identify purchasing behavior associated with various demographics, etc.

Figure 1:
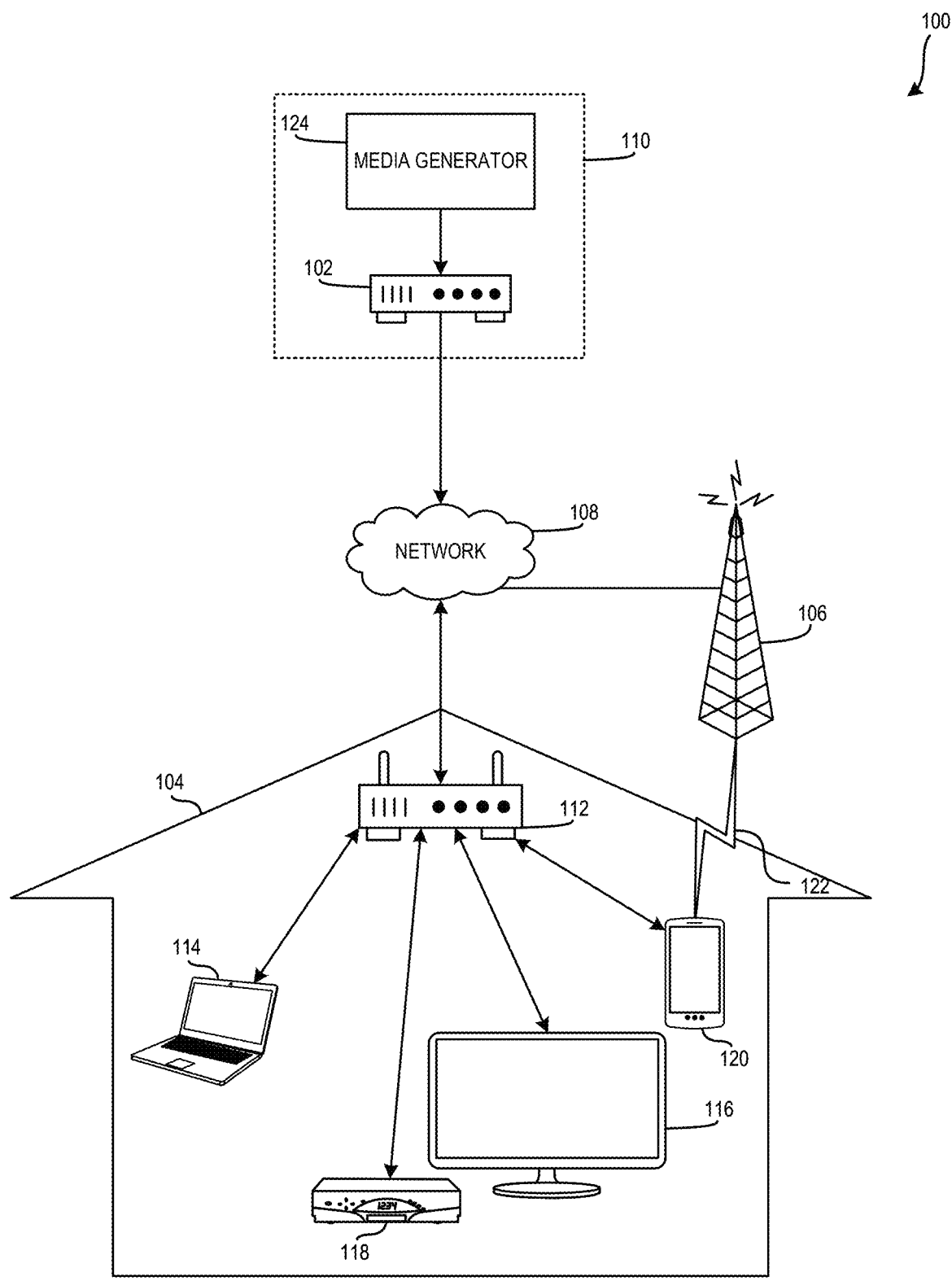
FIG. 1 is a block diagram of an example environment including an example watermark encoder structured to perform time alignment for watermarks in accordance with teachings of this disclosure.

In general, the same reference numbers will be used throughout the drawing(s) and accompanying written description to refer to the same or like parts. The figures are not to scale. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and refer to any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a time interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that matched with the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

As described above, audience measurement entities (AMEs) utilize audio watermarking to identify media such as television broadcasts, radio broadcasts, advertisements (television and/or radio), downloaded media, streaming media, prepackaged media, etc. Some advertisements (e.g., commercials) have a short duration (e.g., between six and fifteen seconds). Additionally, some watermarking techniques utilize watermarks having short durations. For example, Nielsen Watermark Commercial Code (NWCC) watermarks have a duration of 1.6 seconds (s), and Critical Band Encoding Technology (CBET) watermarks have a duration of 2.4 seconds. Detecting short watermarks in short advertisements can be difficult because the duration of the advertisements is on the same order (e.g., the order of seconds, the order of tens of seconds, etc.) as the watermarks. Additionally, detecting short watermarks in short advertisements is further complicated because detecting a short watermark may require multiple observations of the watermark to confirm validity of a detection. Furthermore, environmental impairments may be present adding additional difficulty to detecting short watermarks in short advertisements.

Typically, a watermark includes a message having one or more symbols. Some symbols are referred to as marker symbols. Example marker symbols are indicative of a start point and/or an end point of a message. The watermark (e.g., message) may be placed at any time during the duration of media. For example, if an advertisement is eight seconds in length, a start point of the watermark may be one second into (e.g., from the start of) the advertisement. Statistics of detecting short watermarks in short advertisements can be improved by adjusting the start point of the watermark in the media. Examples disclosed herein select a target alignment of a watermark with audio that is to be watermarked so that symbols of the watermark are detectable (e.g., observable). For example, disclosed examples align watermark symbols with regions of an audio signal that can support (e.g., in terms of signal power) the watermark symbols. Additionally, disclosed examples ensure that there are sufficient observable symbols to discern the message of a watermark.

FIG. 1 is a block diagram of an example environment 100 including an example watermark encoder 102 structured to perform time alignment for watermarks in accordance with teachings of this disclosure. The example environment 100 of FIG. 1 includes an example measurement location 104, an example wireless communication system 106, an example network 108, and an example media provider 110. The example measurement location 104 is coupled to the example wireless communication system 106 and the example network 108. The example wireless communication system 106 is coupled to the example network 108. The example watermark encoder 102 and/or, more generally, the media provider 110, is coupled to the example network 108.

In the illustrated example of FIG. 1, the example measurement location 104 includes an example access point 112, an example laptop computer 114, an example media presentation device 116, an example set top box 118, and an example mobile device 120. In the example, each of the example laptop computer 114, the example media presentation device 116, the example set top box 118, and/or the example mobile device 120 is coupled to the access point 112. Additionally, the example mobile device 120 is coupled to the example wireless communication system 106 via an example wireless communication link 122. The example access point 112 is further coupled to the example network 108.

In the illustrated example of FIG. 1, the example measurement location 104 is a panelist household. However, the measurement location 104 may be any other location, such as, for example a non-panelist household, a restaurant, a bar, an office, an airport, a library, an Internet café, etc. While in the illustrated example a single measurement location is shown, any number and/or type(s) of measurement locations may be used. In the example of FIG. 1, the panelist household includes one or more panelists. The panelists are users registered on panels maintained by a ratings entity (e.g., an audience measurement company) that owns and/or operates the ratings entity subsystem.

Traditionally, audience measurement entities (also referred to herein as "ratings entities") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposure to those panelists and different demographic markets.

In some examples, people (e.g., households, organizations, etc.) register as panelists via, for example, a user interface presented on a media device (e.g., via a website). People may be recruited as panelists in additional or alternative manners such as, for example, via a telephone interview, by completing an online survey, etc. Additionally or alternatively, people may be contacted and/or enlisted to join a panel using any desired methodology (e.g., random selection, statistical selection, phone solicitations, Internet advertisements, surveys, advertisements in shopping malls, product packaging, etc.). In some examples, the measurement location 104 may correspond to people or organizations that subscribe to a service provided by an audience measurement entity.

In the illustrated example of FIG. 1, the network 108 is the Internet. However, the example network 108 may be implemented using any suitable wired and/or wireless network(s) including, for example, one or more data buses, one or more Local Area Networks (LANs), one or more wireless LANs, one or more cellular networks, one or more private networks, one or more public networks, etc. The example network 108 enables media encoded by the watermark encoder 102 to be transmitted to one or more devices in the measurement location 104 and/or other measurement locations.

In the illustrated example of FIG. 1, the media provider 110 includes an example media generator 124 and the example watermark encoder 102. The example media generator 124 is coupled to the example watermark encoder 102 and the example watermark encoder 102 is coupled to the example network 108. In the example of FIG. 1, the example media provider 110 is an entity that provides media to one or more media measurement locations (e.g., measurement location 104) for viewing by panelists in the one or more media measurement locations. The example media generator 124 of FIG. 1 is a server providing Internet media (e.g., web pages, audio, videos, images, etc.). The example media generator 124 may be implemented by any provider(s) of media such as a digital broadcast provider (e.g., cable television service, fiber-optic television service, etc.) and/or an on-demand digital media provider (e.g., Internet streaming video and/or audio services such as Netflix®, You-Tube®, Hulu®, Pandora®, Last.fm®, etc.) and/or any other provider of streaming media services. In some examples, the example media generator 124 is a host for web site(s). Additionally or alternatively, the media generator 124 may not be on the Internet. For example, the media provider 110 may be on a private and/or semi-private network (e.g., a LAN, a virtual private network) to which one or more of the devices in the measurement location 104 connect.

In the illustrated example of FIG. 1, the media provider 110 includes the example watermark encoder 102. The watermark encoder 102 encodes one or more watermarks into one or more video and/or audio signals that are presented to an audience via the network 108. For example, the watermark encoder 102 encodes watermarks into video and/or audio signals generated by the media generator 124. Additionally, the watermark encoder 102 transmits the encoded media (e.g., the media generated by the media generator 124) to the network 108.

In the illustrated example of FIG. 1, the measurement location 104 includes the access point 112. The example access point 112 is an integrated router modem combination. In the example of FIG. 1, the access point 112 enables network communications of the measurement location 104 to reach the network 108. In some examples, the access point 112 is a digital subscriber line (DSL) modem, while in some examples the access point 112 is a cable modem. In some examples, the access point 112 is a media converter that converts one communications medium (e.g., electrical communications, optical communications, wireless communications, etc.) into another type of communications medium. In some examples, the access point 112 is separate from a network gateway (e.g., a router, a link, a switch, etc.).

In the illustrated example of FIG. 1, the measurement location 104 includes the media presentation device 116. In the example of FIG. 1, the media presentation device 116 is a device that may receive any type of media and present the media. For example, the media presentation device 116 may be an Internet-enabled television, a personal computer, an Internet-enabled mobile handset (e.g., a smartphone), a tablet computer (e.g., an iPad), etc. In some examples, the media presentation device 116 presents media sent from the set top box 118 via a wired and/or wireless connection, and/or media sent from a media service provider via a wired and/or wireless connection, etc. In additional or alternative examples, the media presentation device 116 presents the media sent to it from the set top box 118 with supplementary media presentation devices such as speakers, projectors, additional screens, etc.

In the illustrated example of FIG. 1, the example measurement location 104 includes the set top box 118. In the illustrated example, the set top box 118 is a device that converts digital signals to analogue signals for viewing on a media presentation device such as the media presentation device 116. In some examples, the set top box 118 enables cable or satellite input to the media presentation device 116. In the example of FIG. 1, the example measurement location 104 includes the example mobile device 120. The example mobile device 120 is coupled to the example access point 112. In the example of FIG. 1, the mobile device 120 is a cellular phone. In some examples, the mobile device 120 is a tablet computer or any other type of mobile computing device.

In some examples, the mobile device 120 is unable to transmit information via the access point 112. For example, a server upstream of the access point 112 may not provide functional routing capabilities to the network 108. In the illustrated example of FIG. 1, the mobile device 120 includes additional capabilities to communicate with the network 108. As illustrated in FIG. 1, the mobile device 120 includes the capabilities to send information through the wireless communication system 106 (e.g., the cellular communication system) via the wireless communication link 122.

In the illustrated example of FIG. 1, the wireless communication link 122 is a cellular communication link. However, any other method and/or system of communication may additionally or alternatively be used such as, for example, an Ethernet connection, a Bluetooth connection, a Wi-Fi connection, etc. Further, the wireless communication link 122 of FIG. 1 implements a cellular connection via a Global System for Mobile Communications (GSM). However, any other systems and/or protocols for communications may be used such as, for example, Time Division Multiple Access (TDMA), Code Division Multiple Access (CDMA), Worldwide Interoperability for Microwave Access (WiMAX), Long Term Evolution (LTE), etc.

In the illustrated example of FIG. 1, one or more meters may be installed at the measurement location 104 and/or provided to panelists to monitor media accessed and/or presented by one or more of the access point 112, the laptop computer 114, the media presentation device 116, the set top box 118, and/or the mobile device 120. For example, the one or more meters monitor accessed and/or presented media for one or more watermarks. In some examples, the media includes program content (e.g., a TV show, a movie, etc.). In additional or alternative examples, the media includes advertisements such as commercials. As described above, detecting short watermarks in short advertisements can be difficult. To overcome the difficulties presented by detecting short watermarks in short advertisement and/or, more generally, to improve detection of watermarks, the example watermark encoder 102 performs alignment (e.g., the start point) of a watermark template to media based on the structure of audio power versus time characteristics of the media to be watermarked. In some examples, the watermark encoder 102 additionally or alternatively performs the alignment (e.g., the start point) of the watermark template to the media based on the probability of detection of individual symbols in the watermark template.

For example, the watermark encoder 102 implements a two-phase encoding procedure for time alignment for watermarks such as NWCC watermarks, CBET watermarks, Nielsen Audio Encoding System (NAES) 2 (N2) watermarks, N2 High Frequency (N2HF) watermarks, Billions of Codes (BOC) watermarks, Nielsen Watermarks (NWs), etc. In an example first phase, the example watermark encoder 102 analyzes media to determine (e.g., select) a (e.g., optimal) time alignment for a watermark template corresponding to the type of watermark(s) to be embedded in the media. The time alignment can increase (e.g., maximize) the probability of detecting the watermark(s) relative to techniques that do not determine a time alignment based on the media (e.g., techniques that randomly align watermarks to media, techniques that utilize a fixed alignment corresponding to the start of the media, etc.). In an example second phase, the example watermark encoder 102 encodes the watermark(s) into the media using the determined time alignment. In the example of FIG. 1, the watermark encoder 102 implements example time alignment before media is watermarked. For example, the watermark encoder 102 implements example time alignment after a watermark has been selected but before the watermark has been encoded in media.

Figure 2:
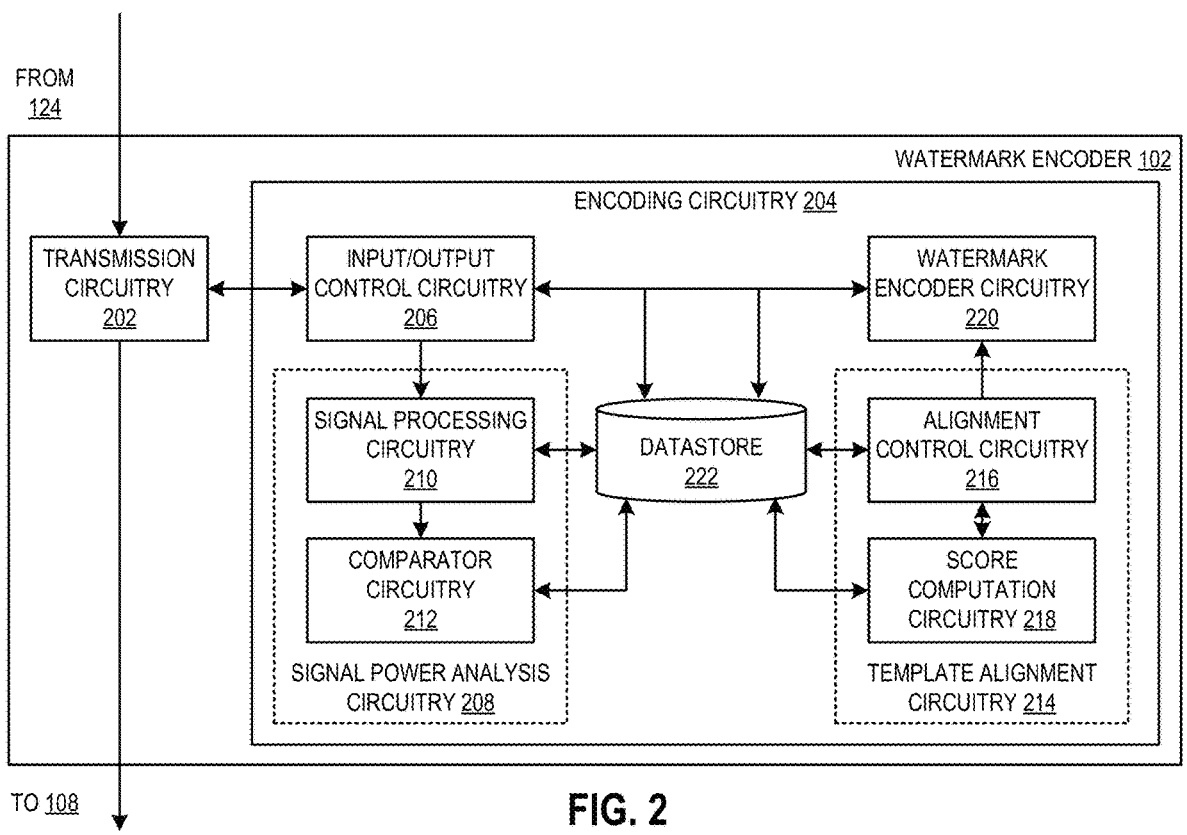
FIG. 2 is a block diagram of the example watermark encoder of FIG. 1 to perform time alignment for watermarks.

FIG. 2 is a block diagram of the example watermark encoder 102 of FIG. 1 to perform time alignment for watermarks. The watermark encoder 102 of FIG. 2 includes example transmission circuitry 202 and example encoding circuitry 204. The example encoding circuitry 204 of FIG. 2 may be instantiated (e.g., creating an instance of, bring into being for any length of time, materialize, implement, etc.) by processor circuitry such as a central processing unit executing instructions. Additionally or alternatively, the example encoding circuitry 204 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

In the illustrated example of FIG. 2, the encoding circuitry 204 includes example input/output (I/O) control circuitry 206 and example signal power analysis circuitry 208. The example signal power analysis circuitry 208 includes example signal processing circuitry 210 and example comparator circuitry 212. In the example of FIG. 2, the encoding circuitry 204 further includes example template alignment circuitry 214. The example template alignment circuitry 214 includes example alignment control circuitry 216 and example score computation circuitry 218. The example encoding circuitry 204 further includes example watermark encoder circuitry 220 and an example datastore 222.

In the illustrated example of FIG. 2, the transmission circuitry 202 is implemented by a transceiver capable of communicating with one or more networks, such as one or more wired networks, one or more wireless networks, etc. In additional or alternative examples, the transmission circuitry 202 is implemented by one or more transmitters and one or more receivers capable of communicating with the one or more networks. In the example of FIG. 2, the transmission circuitry 202 is coupled to or otherwise in communication with the media generator 124 of FIG. 1, the network 108 of FIG. 1, and the I/O control circuitry 206. In the example of FIG. 2, the transmission circuitry 202 receives media to be encoded with one or more watermarks (e.g., to be encoded with a plurality of watermarks) from the media generator 124 and transmits encoded media to the network 108.

In some examples, the watermark encoder 102 includes means for transmitting. For example, the means for transmitting may be implemented by the transmission circuitry 202. In some examples, the transmission circuitry 202 may be instantiated by processor circuitry such as the example processor circuitry 712 of FIG. 7. For instance, the transmission circuitry 202 may be instantiated by the example microprocessor 800 of FIG. 8 executing machine executable instructions such as those implemented by at least block 416 of FIG. 4. In some examples, the transmission circuitry 202 may be instantiated by hardware logic circuitry, which may be implemented by an ASIC, XPU, or the FPGA circuitry 900 of FIG. 9 structured to perform operations corresponding to the machine readable instructions. Additionally or alternatively, the transmission circuitry 202 may be instantiated by any other combination of hardware, software, and/or firmware. For example, the transmission circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 2, the I/O control circuitry 206 is coupled to the transmission circuitry 202, the signal processing circuitry 210, the watermark encoder circuitry 220, and the datastore 222. In the illustrated example of FIG. 2, watermark alignment generally occurs prior to initialization of encoding mechanisms. For example, the I/O control circuitry 206 processes one or more media signals received from the transmission circuitry 202 to determine whether media represented by the one or more media signals is a candidate for time alignment (e.g., whether improved watermark alignment is feasible). In the example of FIG. 2, the I/O control circuitry 206 of FIG. 2 analyzes a duration of media represented by a media signal to be encoded with a plurality of watermarks to determine whether the media is a candidate for time alignment. In additional or alternative examples, the I/O control circuitry 206 determines whether media represented by a media signal is a candidate for time alignment based on an input argument received with the media signal. For example, a user of the watermark encoder 102 may specify that a media signal is a candidate for time alignment when the user submits the media signal to the watermark encoder 102 for watermarking.

In the illustrated example of FIG. 2, the I/O control circuitry 206 determines a duration of media represented by a media signal. For example, the I/O control circuitry 206 may determine the duration based on metadata associated with the media signal. The example I/O control circuitry 206 also determines whether the duration of media satisfies (e.g., is greater than, is less than, etc.) a first threshold corresponding to a lower bound of media durations for which watermark detection problems are unlikely. In the example of FIG. 2, the first threshold is set to 80 seconds, but in other examples, the first threshold can be set to a larger or smaller value. Additionally, in the example of FIG. 2, to determine whether the duration of the media satisfies the first threshold, the I/O control circuitry 206 determines whether the duration of the media satisfies the first threshold by determining whether the duration of the media is greater than (or greater than or equal to) the first threshold.

In the illustrated example of FIG. 2, if the I/O control circuitry 206 determines that the duration of the media satisfies the first threshold, the I/O control circuitry 206 forwards the media signal to the watermark encoder circuitry 220 to be encoded with one or more watermarks utilizing standard encoding techniques. In the example of FIG. 2, if the I/O control circuitry 206 determines that the duration of the media does not satisfy the first threshold, the I/O control circuitry 206 determines whether the duration of the media satisfies a second threshold corresponding to an upper bound of media durations for which improved detection of watermarks is feasible. In the example of FIG. 2, the second threshold is set to six seconds, but in other examples, the second threshold can be set to a larger or smaller value. Additionally, in the example of FIG. 2, to determine whether the duration of the media satisfies the second threshold, the I/O control circuitry 206 determines whether the duration of the media is greater than (or greater than or equal to) the second threshold.

In the illustrated example of FIG. 2, if the I/O control circuitry 206 determines that the duration of the media does not satisfy the second threshold, the I/O control circuitry 206 forwards the media signal to the watermark encoder circuitry 220 to be encoded with one or more watermarks utilizing standard encoding techniques. If the I/O control circuitry 206 determines that the duration of the media satisfies the second threshold, the I/O control circuitry 206 forwards the media signal to the signal power analysis circuitry 208 to initiate watermark alignment optimization. In some examples, the first threshold or the second threshold may be the same or different values. Additionally, while the first threshold and the second threshold are set values in the example of FIG. 2, in additional or alternative examples, one or more of the first threshold or the second threshold may be adjustable, learned (e.g., adapted), etc., depending on the type of watermark to be encoded, and/or the like. In some examples, the I/O control circuitry 206 is instantiated by processor circuitry executing I/O control instructions and/or configured to perform operations such as those represented by the flowchart of FIG. 4.

In additional or alternative examples, the watermark encoder 102 includes means for controlling I/O. For example, the means for controlling I/O may be implemented by the I/O control circuitry 206. In some examples, the I/O control circuitry 206 may be instantiated by processor circuitry such as the example processor circuitry 712 of FIG. 7. For instance, the I/O control circuitry 206 may be instantiated by the example microprocessor 800 of FIG. 8 executing machine executable instructions such as those implemented by at least blocks 402, 404, and 406 of FIG. 4. In some examples, the I/O control circuitry 206 may be instantiated by hardware logic circuitry, which may be implemented by an ASIC, XPU, or the FPGA circuitry 900 of FIG. 9 structured to perform operations corresponding to the machine readable instructions. Additionally or alternatively, the I/O control circuitry 206 may be instantiated by any other combination of hardware, software, and/or firmware. For example, the I/O control circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In examples disclosed herein, because some watermark encoders support encoding multiple types of watermarks, one or more constraints may exist on a fundamental time block for encoding. For example, watermark encoders that support N2, N2HF, NW, BOC, and CBET watermarks may be required to operate according to the fundamental time block (e.g., 512 samples at 48 kilohertz (kHz) or about 10.67 milliseconds (ms)) of N2 and N2HF watermarks even though the fundamental time block (e.g., 256 samples at 48 kHz or about 5.33 ms) of NW and CBET watermarks is shorter. In such examples, for every fundamental time block, one cycle of N2 and/or N2HF watermarking may be performed and two cycles of NW and/or CBET watermarking may be performed. In examples disclosed herein, the watermark encoder 102 operates on a global fundamental time block (e.g., 1024 samples at 48 kHz or about 21.33 ms) referred to as a slide. For example, the global fundamental time block is equal to two fundamental time blocks of N2/N2HF watermarks and four fundamental time blocks of NW/CBET watermarks.

Another constraint that may be present on a watermark encoder that supports encoding multiple types of watermarks is that complete messages of different types of watermarks must be encoded. This constraint can increase the duration (e.g., length of time) of watermark encoding cycles. For example, a NWCC watermark has a duration of 1.6 seconds while a CBET watermark has a duration of 2.4 seconds. As such, an example watermark encoder encoding both NWCC watermarks and CBET watermarks may be required to encode 4.8 seconds (e.g., the least common multiple of 1.6 seconds and 2.4 seconds) of watermarks in media. In examples disclosed herein, the watermark encoder 102 supports both NWCC watermarks and CBET watermarks. As such, the example watermark encoder 102 utilizes a 4.8 second encoding cycle. With a slide of 1024 samples at 48 kHz, a 4.8 second encoding cycle equates to 225 global fundamental time blocks (e.g., slides) and represents three NWCC watermark durations and two CBET watermark durations.

Accordingly, a watermark template for the encoding cycle can be represented as 225 slides. As used herein, a watermark template refers to a representation of the message structure of one or more watermarks spaced over the 225 slides of the encoding cycle. In example watermark templates (sometimes referred to as templates), block time equivalent synchronization and watermark symbols are represented as floating point values. For example, the power value of a watermark symbol may be represented as a floating point value. In this manner, the 225 slides of a watermark template represent elements of the watermark template. Multiple watermark templates can be created depending on the message structure of the type of watermark to be encoded. For example, a first watermark template can be created for NWCC watermarks, and a second watermark template can be created for CBET watermarks because NWCC watermarks and CBET watermarks have different message structures.

In the illustrated example of FIG. 2, the signal power analysis circuitry 208 performs a power analysis on a media signal to determine candidate locations in the media signal for encoding of watermarks. For example, to mark candidate locations, the signal power analysis circuitry 208 adjusts a power value of an element of a template based on respective average magnitudes of and respective tonality ratios for a plurality of frequency representations of a media signal to be encoded with one or more watermarks. In some examples, the watermark encoder 102 includes means for analyzing signal power. For example, the means for analyzing signal power may be implemented by the signal power analysis circuitry 208.

Figure 7:
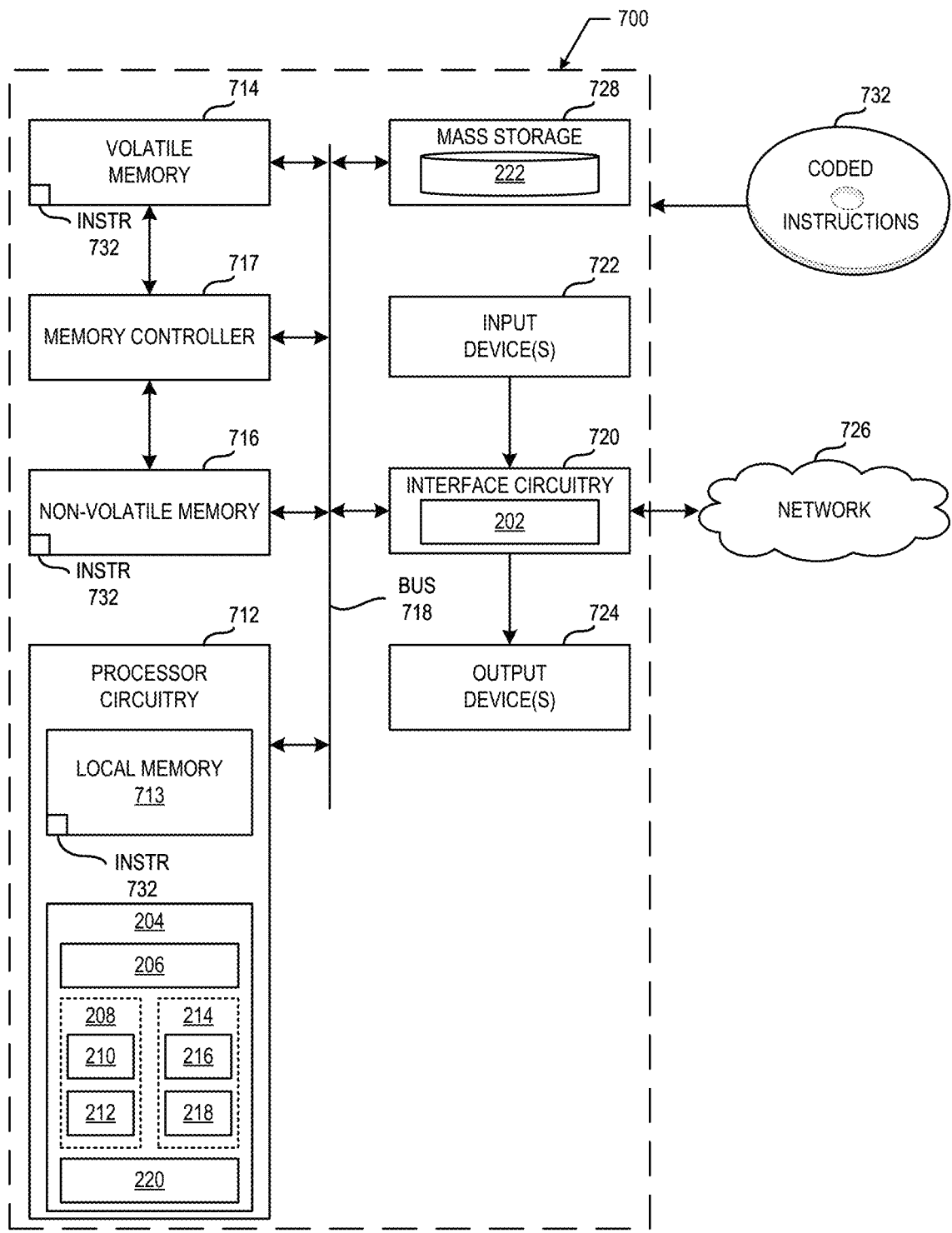
FIG. 7 is a block diagram of an example processing platform including processor circuitry structured to execute example machine readable instructions and/or the example operations of FIGS. 4, 5, and/or 6 to implement the example watermark encoder of FIGS. 1 and/or 2.

In additional or alternative examples, the signal power analysis circuitry 208 may be instantiated by processor circuitry such as the example processor circuitry 712 of FIG. 7. For instance, the signal power analysis circuitry 208 may be instantiated by the example microprocessor 800 of FIG. 8 executing machine executable instructions such as those implemented by at least block 408 of FIG. 4 and/or at least blocks 502, 504, 506, 508, 510, 512, 514, 516, 518, 520, 522, 524, 526, 528, 530, 532, and 534 of FIG. 5. In some examples, the signal power analysis circuitry 208 may be instantiated by hardware logic circuitry, which may be implemented by an ASIC, XPU, or the FPGA circuitry 900 of FIG. 9 structured to perform operations corresponding to the machine readable instructions. Additionally or alternatively, the signal power analysis circuitry 208 may be instantiated by any other combination of hardware, software, and/or firmware. For example, the signal power analysis circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

As described above, the signal power analysis circuitry 208 includes the example signal processing circuitry 210. In the example of FIG. 2, the signal processing circuitry 210 is coupled to the I/O control circuitry 206, the comparator circuitry 212, and the datastore 222. In the example of FIG. 2, to initiate watermark alignment optimization, the signal processing circuitry 210 causes data representative of a media signal to be buffered in memory. For example, the signal processing circuitry 210 causes the entirety of a media signal (e.g., an audio file) to be buffered in the datastore 222. In some examples, the signal processing circuitry 210 causes a portion (e.g., a portion less than the entirety) of the media signal to be buffered in the datastore 222 and may incrementally process the media signal. Such an example may be beneficial when processor resources are constrained and/or processor throughput and/or memory bandwidth are limited.

In the illustrated example of FIG. 2, based on the data buffered in memory, the signal processing circuitry 210 generates a plurality of frequency representations of the media signal where respective frequency representations correspond to elements of the template. For example, the signal processing circuitry 210 executes a plurality of fast Fourier transforms (FFTs) on an audio component of the media signal to generate the plurality of frequency representations. In the example of FIG. 2, the signal processing circuitry 210 executes a plurality of 2048-point Blackman windowed FFTs with 50% overlap between individual FFTs. The result of each FFT corresponds to an element (e.g., a slide) of the watermark template.

In the illustrated example of FIG. 2, the result of each FFT (sometimes referred to as an FFT result) may be represented as N-element vector where each element corresponds to a frequency bin of the FFT, and the value of the element represents the power of an audio component of the media signal in the frequency bin. If the audio component of the media signal is represented in stereo (e.g., the audio component includes channels for left (L) and right (R)), the signal processing circuitry 210 sums the results of the FFTs for the L and R channels and assigns the summed result as the result of the FFT. Similarly, if the audio component of the media signal is represented by more than two channels (e.g., NWCC and CBET watermarks are applied to L, R, and center (C) audio channels), the signal processing circuitry 210 sums the results of the FFTs for all channels and assigns the summed result as the result of the FFT (e.g., FFT_Result=FFT(L)+FFT(R)+FFT(C)). In the example of FIG. 2, the signal processing circuitry 210 may cause storage of the FFT results in the datastore 222.

As described above, in the illustrated example of FIG. 2, the watermark encoder 102 supports multiple types of watermarks. For example, the watermark encoder 102 supports N2, N2HF, NW, NWCC, BOC, and CBET watermarks. Different types of watermarks may be encoded in different frequency ranges for a media signal. As such, for a bin range of interest (e.g., an NWCC bin range of interest, a CBET bin range of interest, etc.), the signal processing circuitry 210 converts values of the bins in the bin range from power to magnitude. For each frequency representation of the media signal, the signal processing circuitry 210 determines an upper value (e.g., maximum value) for the bin range of interest based on a local maximum value of the bin range of interest and at least two values of at least two adjacent bins (e.g., one bin to the left and one bin to the right of the bin having the local maximum value). For example, the signal processing circuitry 210 computes the upper value as the average of the local maximum value and the at least two values of the at least two adjacent bins. In some examples, more than one bin on each side of the bin having the local maximum value may be selected (e.g., two bins on each side, three bins on each side, etc.). In examples disclosed herein, the upper value is referred to as [dMaxMag].

In the illustrated example of FIG. 2, the signal processing circuitry 210 computes an average magnitude across the bin range of interest. For example, the signal processing circuitry 210 computes the average magnitude by excluding (e.g., disregarding, filtering out, etc.) the local maximum value and the at least two values of the at least two adjacent bins. In examples disclosed herein, the average magnitude is referred to as [dAvgMag]. In the example of FIG. 2, the signal processing circuitry 210 computes a tonality ratio between the upper value (e.g., maximum value [dMaxMag]) and the average magnitude (e.g., the average magnitude [dAvgMag]) across the bin range of interest. The example tonality ratio models the tonality of the bin range of interest (e.g., how tonal the bin range is). For example, a large tonality ratio indicates that the upper value (e.g., [dMaxMag]) dominates over other frequency bins in the bin range of interest resulting in an audible tone at the frequency of the bin having the local maximum value. In examples disclosed herein, the tonality ratio is referred to as [dMagRatio]. In the example of FIG. 2, the signal processing circuitry 210 may cause storage of one or more of the upper value, the average magnitude, or the tonality ratio for one or more FFT results in the datastore 222. In some examples, the signal processing circuitry 210 is instantiated by processor circuitry executing signal processing instructions and/or configured to perform operations such as those represented by the flowcharts of FIGS. 4 and/or 5.

In additional or alternative examples, the watermark encoder 102 includes means for processing signals. For example, the means for processing signals may be implemented by the signal processing circuitry 210. In some examples, the signal processing circuitry 210 may be instantiated by processor circuitry such as the example processor circuitry 712 of FIG. 7. For instance, the signal processing circuitry 210 may be instantiated by the example microprocessor 800 of FIG. 8 executing machine executable instructions such as those implemented by at least blocks 502, 504, 506, 508, 510, 512, 514, 516, 528, 530, 532, and 534 of FIG. 5. In some examples, the signal processing circuitry 210 may be instantiated by hardware logic circuitry, which may be implemented by an ASIC, XPU, or the FPGA circuitry 900 of FIG. 9 structured to perform operations corresponding to the machine readable instructions. Additionally or alternatively, the signal processing circuitry 210 may be instantiated by any other combination of hardware, software, and/or firmware. For example, the signal processing circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 2, as described above, the signal power analysis circuitry 208 includes the example comparator circuitry 212. In the example of FIG. 2, the comparator circuitry 212 is coupled to the signal processing circuitry 210, and the datastore 222. In the example of FIG. 2, the comparator circuitry 212 compares the average magnitude (e.g., [dAvgMag]) to an average magnitude threshold. For example, the comparator circuitry 212 determines whether the average magnitude (e.g., [dAvgMag]) is greater than (or greater than or equal to) the average magnitude threshold. In the example of FIG. 2, the average magnitude threshold corresponds to a current type of watermark being evaluated (e.g., a value specific to the type of the watermark to be encoded).

In the illustrated example of FIG. 2, if the comparator circuitry 212 determines that the average magnitude (e.g., [dAvgMag]) does not satisfy (e.g., is less than, or is less than or equal to) the average magnitude threshold, the comparator circuitry 212 sets an encoding candidate variable to false. For example, the encoding candidate variable corresponds to an element of the template that corresponds to the current frequency representation being evaluated. In examples disclosed herein, encoding candidate variables are Boolean variables stored in the datastore 222. For example, the datastore 222 maintains one or more vectors representative of one or more templates corresponding to respective types of watermarks. Each element of a vector corresponds to the encoding candidate variable for an element (e.g., slide) of the template. In the example of FIG. 2, for CBET watermarks, the vector is referred to as m_bCbetCanEncode[uSlideNdx].

In the illustrated example of FIG. 2, if the comparator circuitry 212 determines that the average magnitude satisfies (e.g., is greater than, or is greater than or equal to) the average magnitude threshold, the comparator circuitry 212 determines whether the tonality ratio (e.g., [dMagRatio]) satisfies (e.g., is greater than, or is greater than or equal to) a tonality ratio threshold. If the comparator circuitry 212 determines that the tonality ratio does not satisfy (e.g., is less than, or is less than or equal to) the tonality ratio threshold, the comparator circuitry 212 sets the encoding candidate variable to true. If the comparator circuitry 212 determines that the tonality ratio satisfies (e.g., is greater than, or is greater than or equal to) the tonality ratio threshold, the comparator circuitry 212 sets the encoding candidate variable to false.

In the illustrated example of FIG. 2, the comparator circuitry 212 determines the value of the encoding candidate variable for the current frequency representation. If the comparator circuitry 212 determines that the encoding candidate variable is true, the comparator circuitry 212 sets a power value for the element of the template that corresponds to the current frequency representation being evaluated to a clamped power (e.g., a clamped CBET power for the CBET watermark template). In some examples, the comparator circuitry 212 is instantiated by processor circuitry executing comparator instructions and/or configured to perform operations such as those represented by the flowcharts of FIGS. 4 and/or 5. The signal power analysis circuitry 208 (e.g., the signal processing circuitry 210 and the comparator circuitry 212) repeats the power analysis for each of the plurality of frequency representations of the media signal and each type of watermark supported by the watermark encoder 102 using corresponding bin ranges (e.g., an NWCC bin range) and corresponding values (e.g., NWCC specific values).

In some examples, the watermark encoder 102 includes means for comparing. For example, the means for comparing may be implemented by the comparator circuitry 212. In some examples, the comparator circuitry 212 may be instantiated by processor circuitry such as the example processor circuitry 712 of FIG. 7. For instance, the comparator circuitry 212 may be instantiated by the example microprocessor 800 of FIG. 8 executing machine executable instructions such as those implemented by at least blocks 518, 520, 522, 524, and 526 of FIG. 5. In some examples, the comparator circuitry 212 may be instantiated by hardware logic circuitry, which may be implemented by an ASIC, XPU, or the FPGA circuitry 900 of FIG. 9 structured to perform operations corresponding to the machine readable instructions. Additionally or alternatively, the comparator circuitry 212 may be instantiated by any other combination of hardware, software, and/or firmware. For example, the comparator circuitry 212 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 2, after the signal power analysis circuitry 208 performs a power analysis on a media signal to determine candidate locations in the media signal for encoding of watermarks, the template alignment circuitry 214 computes an alignment of the watermark template to the media signal based on respective power values of elements of the watermark template. In some examples, the watermark encoder 102 includes means for aligning templates. For example, the means for aligning templates may be implemented by the template alignment circuitry 214. In some examples, the template alignment circuitry 214 may be instantiated by processor circuitry such as the example processor circuitry 712 of FIG. 7. For instance, the template alignment circuitry 214 may be instantiated by the example microprocessor 800 of FIG. 8 executing machine executable instructions such as those implemented by at least block 410 of FIG. 4 and/or at least blocks 602, 604, 606, 608, 610, 612, 614, 616, 618, 620, and 622 of FIG. 6.

Figure 9:
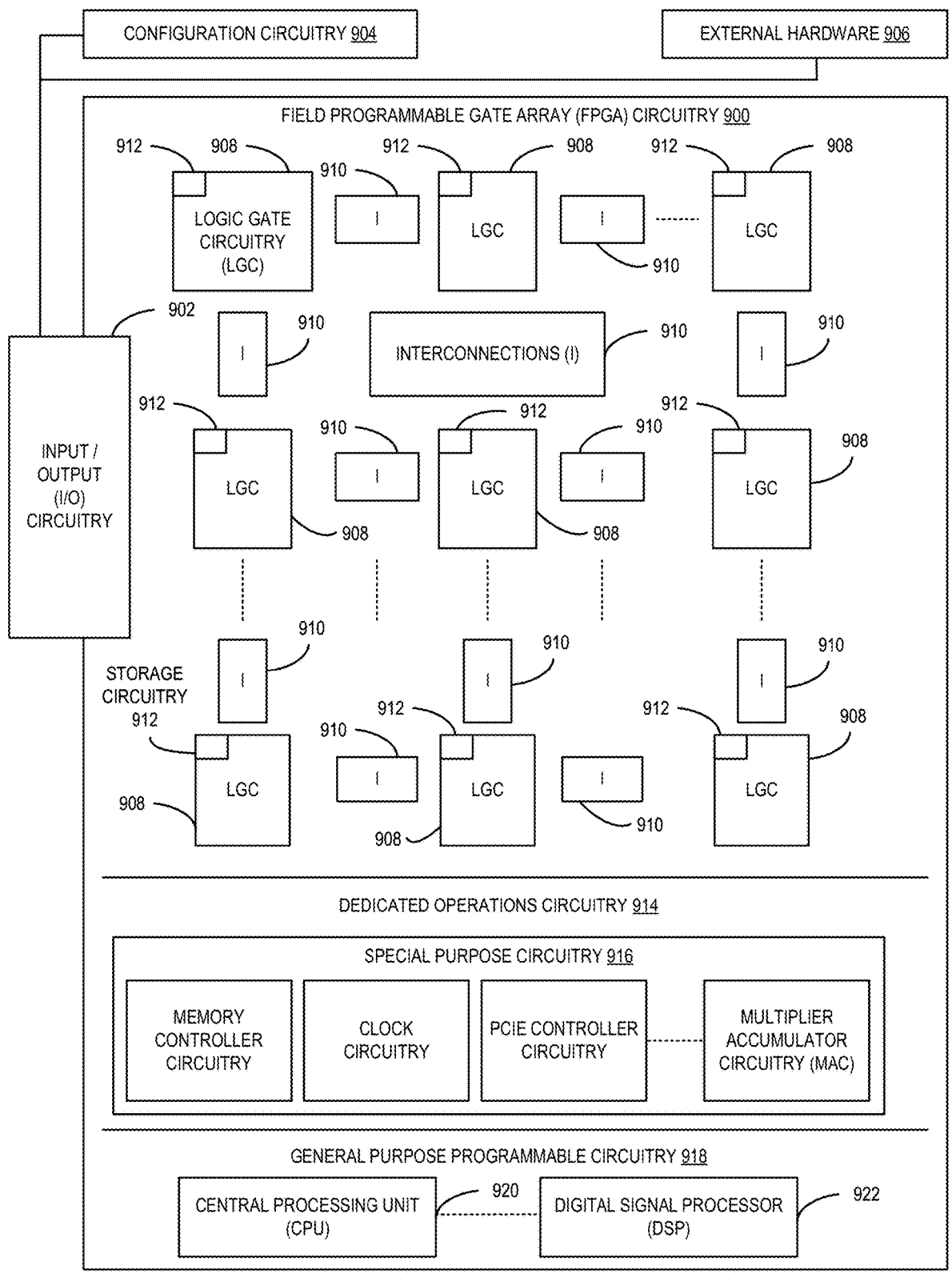
FIG. 9 is a block diagram of another example implementation of the processor circuitry of FIG. 7.

In some examples, the template alignment circuitry 214 may be instantiated by hardware logic circuitry, which may be implemented by an ASIC, XPU, or the FPGA circuitry 900 of FIG. 9 structured to perform operations corresponding to the machine readable instructions. In additional or alternative examples, the template alignment circuitry 214 may be instantiated by any other combination of hardware, software, and/or firmware. For example, the template alignment circuitry 214 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

As described above, the example template alignment circuitry 214 includes the example alignment control circuitry 216 and the example score computation circuitry 218.

Figure 3:
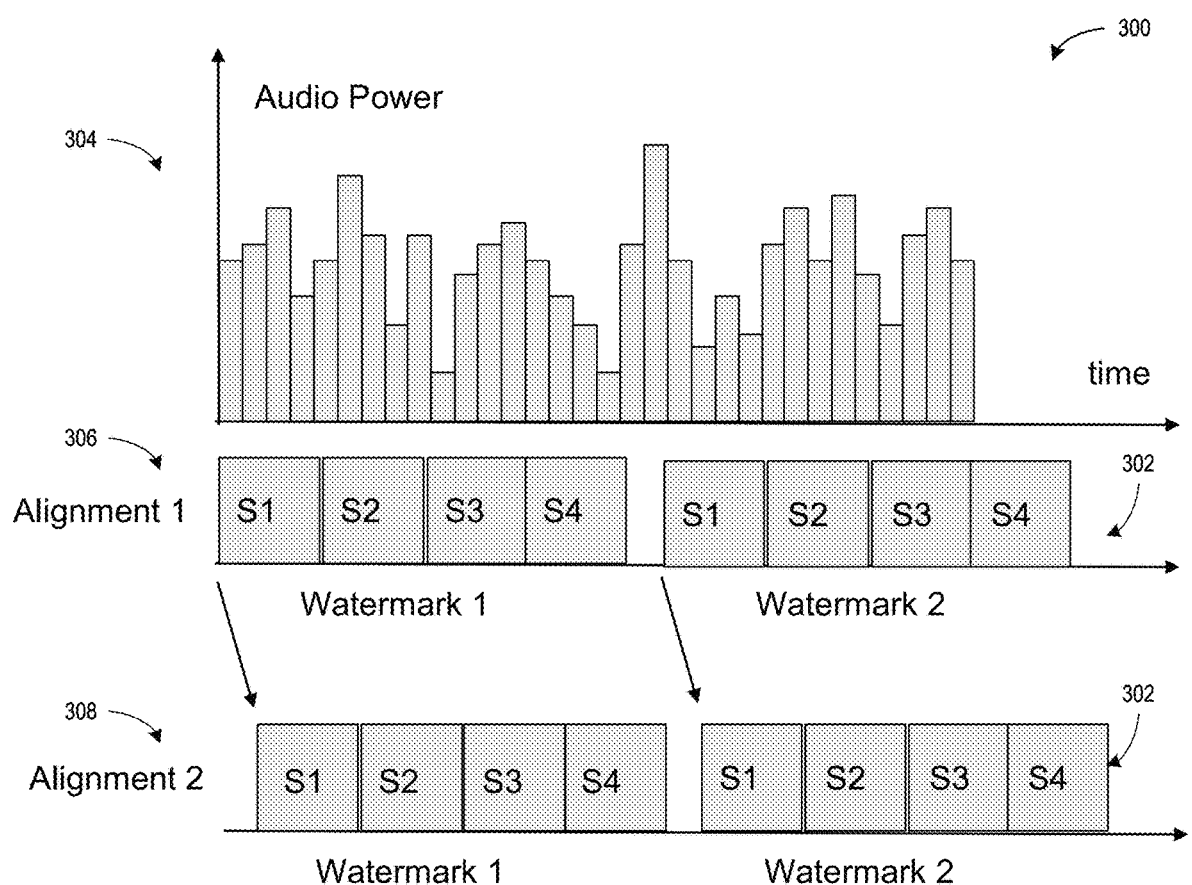
FIG. 3 is a graphical illustration of example alignments of an example watermark template to media.

In the example of FIG. 2, the alignment control circuitry 216 is coupled to the score computation circuitry 218, the watermark encoder circuitry 220, and the datastore 222. In the example of FIG. 2, the alignment control circuitry 216 selects a candidate alignment of a watermark template to the media signal. For example, FIG. 3 is a graphical illustration 300 of example alignments of an example watermark template 302 to an example media signal 304. In the example of FIG. 3, the media signal 304 is represented on a graph of audio power versus time. The graphical illustration 300 includes an example first alignment 306 of the example watermark template 302 and an example second alignment 308 of the example watermark template 302. The first alignment 306 and the second alignment 308 illustrate two candidate alignments of the watermark template 302 relative to the audio power of the media signal 304.

Returning to FIG. 2, by aligning the watermark template 302 to the media signal 304, the example alignment control circuitry 216 aligns the power values of the symbols S1, S2, S3, and S4 of the one or more watermarks of the watermark template 302 to the audio power of the media signal 304 at the corresponding positions in time. Depending on the alignment technique used, the example template alignment circuitry 214 sums the symbol powers or multiplies the symbol powers in each watermark of the watermark template. Powers of some symbols in a watermark of a watermark template may be weighted.

In examples disclosed herein, one or more techniques may be applied to compute where to align watermark templates. Example techniques include cross-correlation, probability, marker first with probability, and probability with two accumulations. In the illustrated example of FIG. 2, the template alignment circuitry 214 utilizes the probability with two accumulations technique because probability with two accumulations provided alignments that achieved the most detectable watermarks during experimentation. In additional or alternative examples, other techniques may be used. After selecting a candidate alignment of the template to the media signal based on some criteria (e.g., a highest scoring alignment), the alignment control circuitry 216 forwards the selected alignment to the watermark encoder circuitry 220. The watermark encoder circuitry 220 encodes one or more watermarks into the media signal based on the selected alignment. In some examples, the alignment control circuitry 216 is instantiated by processor circuitry executing alignment control instructions and/or configured to perform operations such as those represented by the flowcharts of FIGS. 4 and/or 6.

In additional or alternative examples, the watermark encoder 102 includes means for controlling alignment. For example, the means for controlling alignment may be implemented by the alignment control circuitry 216. In some examples, the alignment control circuitry 216 may be instantiated by processor circuitry such as the example processor circuitry 712 of FIG. 7. For instance, the alignment control circuitry 216 may be instantiated by the example microprocessor 800 of FIG. 8 executing machine executable instructions such as those implemented by at least blocks 602, 604, 612, 614, 618, 620, and 622 of FIG. 6. In some examples, the alignment control circuitry 216 may be instantiated by hardware logic circuitry, which may be implemented by an ASIC, XPU, or the FPGA circuitry 900 of FIG. 9 structured to perform operations corresponding to the machine readable instructions. Additionally or alternatively, the alignment control circuitry 216 may be instantiated by any other combination of hardware, software, and/or firmware. For example, the alignment control circuitry 216 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 2, the score computation circuitry 218 is coupled to the alignment control circuitry 216 and the datastore 222. In the illustrated example of FIG. 2, the score computation circuitry 218 determines a score for each candidate alignment of a watermark template to a media signal. As described above, in the illustrated example of FIG. 2, the template alignment circuitry 214 utilizes the probability with two accumulations technique. For example, for each watermark of a template, the score computation circuitry 218 sums the power values of symbols of the current watermark with respective power values of symbols of at least two adjacent watermarks. For example, respective symbol power values are specified in the template for the type of watermark. The score computation circuitry 218 computes respective probabilities of detecting the symbols of the current watermark based on respective summed power values for the symbols and corresponding power values of the frequency representation of the media signal. Generally, watermark power is proportional to audio power. As such, the probability of detection of a symbol in a message of a watermark is proportional to the audio power at the position of that symbol in time. In the example of FIG. 2, by summing the symbol power values for the current watermark and two adjacent (e.g., nearby) watermarks, the score computation circuitry 218 increases the probability of detecting the current watermark being processed. To compute the respective probabilities of detecting the symbols of the current watermark, the score computation circuitry 218 computes a proportion between the respective summed power values for the symbols and the corresponding power values of the frequency representation of the media signal.

In the illustrated example of FIG. 2, for each watermark of a template, the score computation circuitry 218 computes a product of the respective probabilities of detecting the symbols of the watermark to determine a probability of detecting the current watermark. In examples disclosed herein, detecting a watermark refers to detecting all symbols of the watermark. Because the probability of detecting symbols is the product of the probability of detecting each symbol, the probability of detecting a watermark is the product of the probabilities of detecting each symbol of the watermark. Accordingly, if the probability of detecting any symbol in a watermark is zero, the probability of detecting the watermark is zero due to the multiplication performed on the probabilities. If error correction is applied, this may not always be true.

In the illustrated example of FIG. 2, the score computation circuitry 218 computes a score for an alignment based on the sum of respective probabilities of detecting watermarks of the template for that alignment. The score computation circuitry 218 repeats this process for all candidate alignments and the alignment control circuitry 216 selects the candidate alignment that satisfies one or more criteria for encoding one or more watermarks into the media signal. For example, the alignment control circuitry 216 selects a candidate alignment with the highest score as the alignment for encoding one or more watermarks into the media signal. In additional or alternative examples, the one or more criteria may be a threshold score. In this manner, the score computation circuitry 218 computes respective scores for candidate alignments of the template to the media signal based on respective sums of probabilities of detecting the one or more watermarks of the template. In some examples, the score computation circuitry 218 causes storage of one or more scores in the datastore 222.

Figure 4:
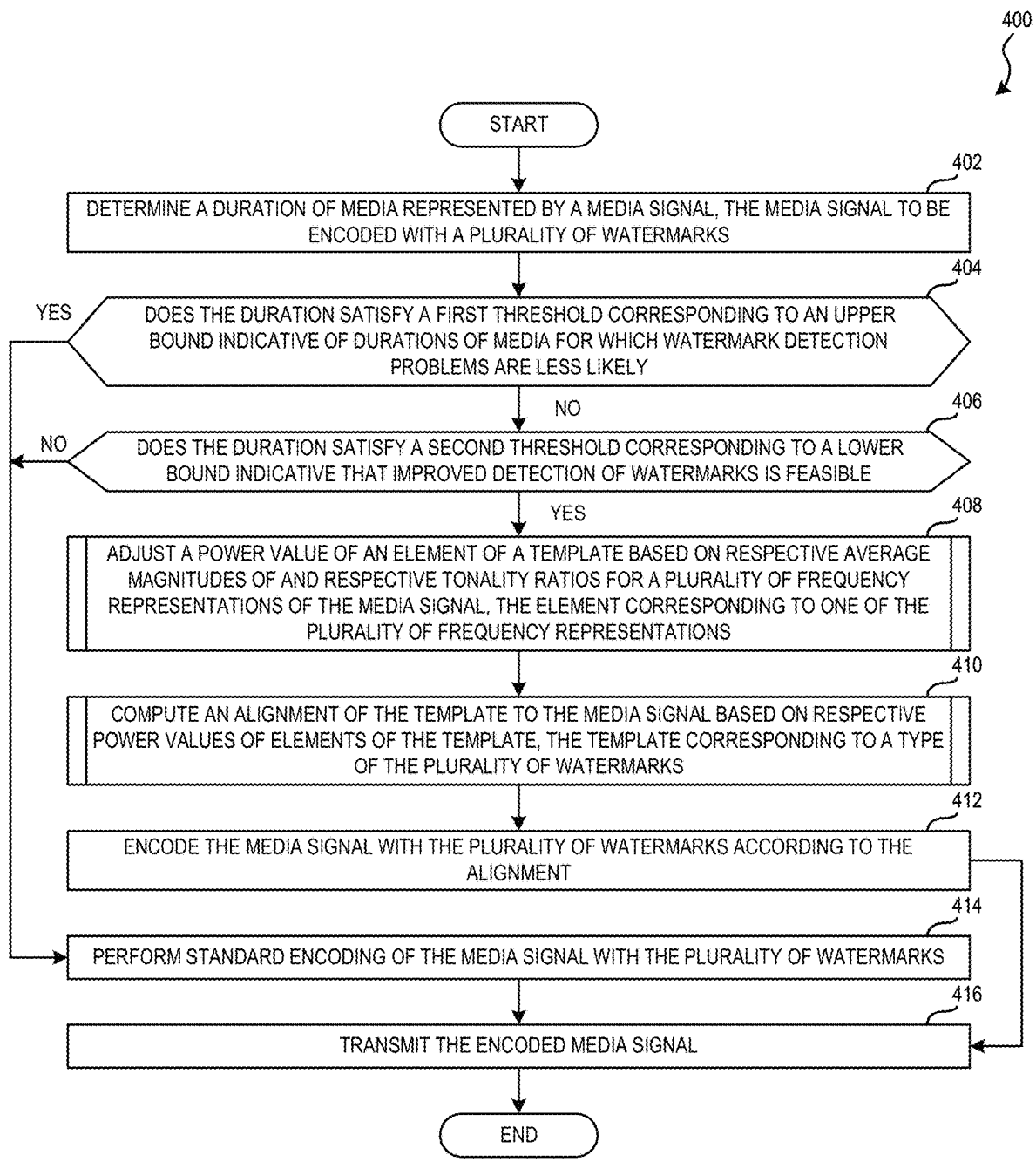
FIG. 4 is a flowchart representative of example machine readable instructions and/or example operations that may be executed and/or instantiated by processor circuitry to implement the example watermark encoder of FIGS. 1 and/or 2.

In some examples, the score computation circuitry 218 is instantiated by processor circuitry executing score computation instructions and/or configured to perform operations such as those represented by the flowcharts of FIGS. 4 and/or 6. In additional or alternative examples, the watermark encoder 102 includes means for computing scores. For example, the means for computing scores may be implemented by the score computation circuitry 218. In some examples, the score computation circuitry 218 may be instantiated by processor circuitry such as the example processor circuitry 712 of FIG. 7. For instance, the score computation circuitry 218 may be instantiated by the example microprocessor 800 of FIG. 8 executing machine executable instructions such as those implemented by at least blocks 606, 608, 610, and 616 of FIG. 6. In some examples, the score computation circuitry 218 may be instantiated by hardware logic circuitry, which may be implemented by an ASIC, XPU, or the FPGA circuitry 900 of FIG. 9 structured to perform operations corresponding to the machine readable instructions. Additionally or alternatively, the score computation circuitry 218 may be instantiated by any other combination of hardware, software, and/or firmware. For example, the score computation circuitry 218 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

As described above, one or more techniques may be applied to compute where to align watermark templates, which include cross-correlation, probability, and marker first with probability. For example, when implementing the cross-correlation technique, the score computation circuitry 218 circularly multiplies respective power values of elements of the template by corresponding power values of the frequency representation of the media signal and sums the products. For example, in cross-correlation, the alignment control circuitry 216 selects a candidate alignment in the frequency representation of the media signal and the score computation circuitry 218 multiplies respective power values of elements of the template by corresponding power values of the frequency representation of the media signal for each watermark type. The score computation circuitry 218 sums the products of the elements of the template for each watermark type. For example, the score computation circuitry 218 determines a first sum of the products of the elements of the CBET template and the frequency representation of the media signal, and a second sum of the product of the elements of the NWCC template and the frequency representation of the media signal.

When implementing the cross-correlation technique, the alignment control circuitry 216 selects the next possible alignment to the media signal and the template alignment circuitry 214 repeats the cross-correlation process for all possible alignments to the media signal. The alignment control circuitry 216 selects an alignment where sums the products of the elements of the template for each watermark type and the frequency representation of the media signal are greatest. For example, the alignment control circuitry 216 selects an alignment where the first sum of the products of the elements the CBET template and the frequency representation of the media signal is greatest, and the second sum of the product of the elements of the NWCC template and the frequency representation of the media signal is greatest. In some examples, different alignments can be selected for the CBET template and for the NWCC template so as to maximize the sums of products for the respective templates.

When implementing the probability technique, the score computation circuitry 218 determines a score for each candidate alignment of a watermark template to a media signal. For example, the alignment control circuitry 216 selects a candidate alignment in the frequency representation of the media signal. As described above, watermark power is generally proportional to audio power and the probability of detection of a symbol in a message is proportional to the audio power at the position of that symbol in time. Because the probability of detecting symbols is the product of the probability of detecting each symbol, the probability of detecting a watermark is the product of the probabilities of detecting each symbol of the watermark.

When implementing the probability technique, for each watermark of the template, the score computation circuitry 218 computes respective probabilities of detecting the symbol of the current watermark based on respective power values for the symbol and corresponding power values of the frequency representation of the media signal. The score computation circuitry 218 sums respective probabilities of detecting watermarks of the template for that alignment to determines a score for a candidate alignment. The alignment control circuitry 216 and the score computation circuitry 218 repeat this process for all candidate alignments and selects the candidate alignment with the highest score as the alignment for encoding.

When implementing the marker first with probability technique, the alignment control circuitry 216 modifies templates for each watermark type so that only the marker symbols (e.g., the start and end symbols) of watermarks have non-zero power values. The alignment control circuitry 216 then selects the indices of the top sixteen alignments from the cross-correlation technique and uses the selected candidate alignments for watermark detection probability analysis. The candidate alignment with the highest probability is selected as the alignment for encoding.

In the illustrated example of FIG. 2, after selecting an alignment (e.g., the optimal alignment) for the watermark template to the media signal, the alignment control circuitry 216 dispatches the selected alignment to the watermark encoder circuitry 220. In the example of FIG. 2, the watermark encoder circuitry 220 is coupled to the I/O control circuitry 206, the alignment control circuitry 216, and the datastore 222. The watermark encoder circuitry 220 encodes one or more watermarks into the media signal. For example, if a media signal is not a candidate for time alignment adjustment, the watermark encoder circuitry 220 encodes the one or more watermarks using standard encoding techniques. However, if a media signal is a candidate for time alignment adjustment, the watermark encoder circuitry 220 encodes one or more watermarks into the media signal according to an alignment computed by the signal power analysis circuitry 208 and/or the template alignment circuitry 214.

In the illustrated example of FIG. 2, the watermark encoder circuitry 220 achieves the selected alignment differently depending on the type of watermark being encoded. For example, for CBET watermarks, the watermark encoder circuitry 220 achieves the selected alignment by adding zero valued audio samples (e.g., up to 4.8 seconds) at the beginning of the encoding process. Additionally or alternatively, for NWCC watermarks, the watermark encoder circuitry 220 achieves the selected alignment by implementing an encoding hold-off feature based on the added number of zero valued audio samples. In some examples, the watermark encoder circuitry 220 is instantiated by processor circuitry executing watermark encoder instructions and/or configured to perform operations such as those represented by the flowchart of FIG. 4.

In additional or alternative examples, the watermark encoder 102 includes means for encoding. For example, the means for encoding may be implemented by the watermark encoder circuitry 220. In some examples, the watermark encoder circuitry 220 may be instantiated by processor circuitry such as the example processor circuitry 712 of FIG. 7. For instance, the watermark encoder circuitry 220 may be instantiated by the example microprocessor 800 of FIG. 8 executing machine executable instructions such as those implemented by at least blocks 412 and 414 of FIG. 4. In some examples, the watermark encoder circuitry 220 may be instantiated by hardware logic circuitry, which may be implemented by an ASIC, XPU, or the FPGA circuitry 900 of FIG. 9 structured to perform operations corresponding to the machine readable instructions. Additionally or alternatively, the watermark encoder circuitry 220 may be instantiated by any other combination of hardware, software, and/or firmware. For example, the watermark encoder circuitry 220 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 2, the datastore 222 is configured to store data. For example, the datastore 222 can store one or more files indicative of one or more media signals, one or more templates, one or more FFT results, one or more bin ranges of interest corresponding to one or more watermark types, one or more upper values per FFT result, one or more average magnitudes per FFT result, one or more tonality ratios per FFT result, one or more candidate variables and/or one or more encoding candidate vectors, one or more candidate alignment scores, one or more threshold corresponding to upper bounds and lower bounds for candidate media signals, one or more average magnitude thresholds corresponding to one or more watermark types, and/or one or more tonality ratio thresholds. In the example of FIG. 2, the datastore 222 may be implemented by a volatile memory (e.g., a Synchronous Dynamic Random-Access Memory (SDRAM), DRAM, RAMBUS Dynamic Random-Access Memory (RDRAM), etc.) and/or a non-volatile memory (e.g., flash memory). The example datastore 222 may additionally or alternatively be implemented by one or more double data rate (DDR) memories, such as DDR, DDR2, DDR3, DDR4, mobile DDR (mDDR), etc.

In additional or alternative examples, the example datastore 222 may be implemented by one or more mass storage devices such as hard disk drive(s), compact disk drive(s), digital versatile disk drive(s), solid-state disk drive(s), etc. While in the illustrated example the datastore 222 is illustrated as a single database, the datastore 222 may be implemented by any number and/or type(s) of databases. Furthermore, the data stored in the datastore 222 may be in any data format such as, for example, binary data, comma delimited data, tab delimited data, structured query language (SQL) structures, etc.

While an example manner of implementing the watermark encoder 102 of FIG. 1 is illustrated in FIG. 2, one or more of the elements, processes, and/or devices illustrated in FIG. 2 may be combined, divided, re-arranged, omitted, eliminated, and/or implemented in any other way. Further, the example transmission circuitry 202, the example encoding circuitry 204, the example I/O control circuitry 206, the example signal power analysis circuitry 208, the example signal processing circuitry 210, the example comparator circuitry 212, the example template alignment circuitry 214, the example alignment control circuitry 216, the example score computation circuitry 218, the example watermark encoder circuitry 220, and/or, more generally, the example watermark encoder 102 of FIG. 1, may be implemented by hardware alone or by hardware in combination with software and/or firmware. Thus, for example, any of the example transmission circuitry 202, the example encoding circuitry 204, the example I/O control circuitry 206, the example signal power analysis circuitry 208, the example signal processing circuitry 210, the example comparator circuitry 212, the example template alignment circuitry 214, the example alignment control circuitry 216, the example score computation circuitry 218, and/or the example watermark encoder circuitry 220, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example watermark encoder 102 may include one or more elements, processes, and/or devices in addition to, or instead of, those illustrated in FIG. 2, and/or may include more than one of any or all of the illustrated elements, processes, and devices.

Figure 5:
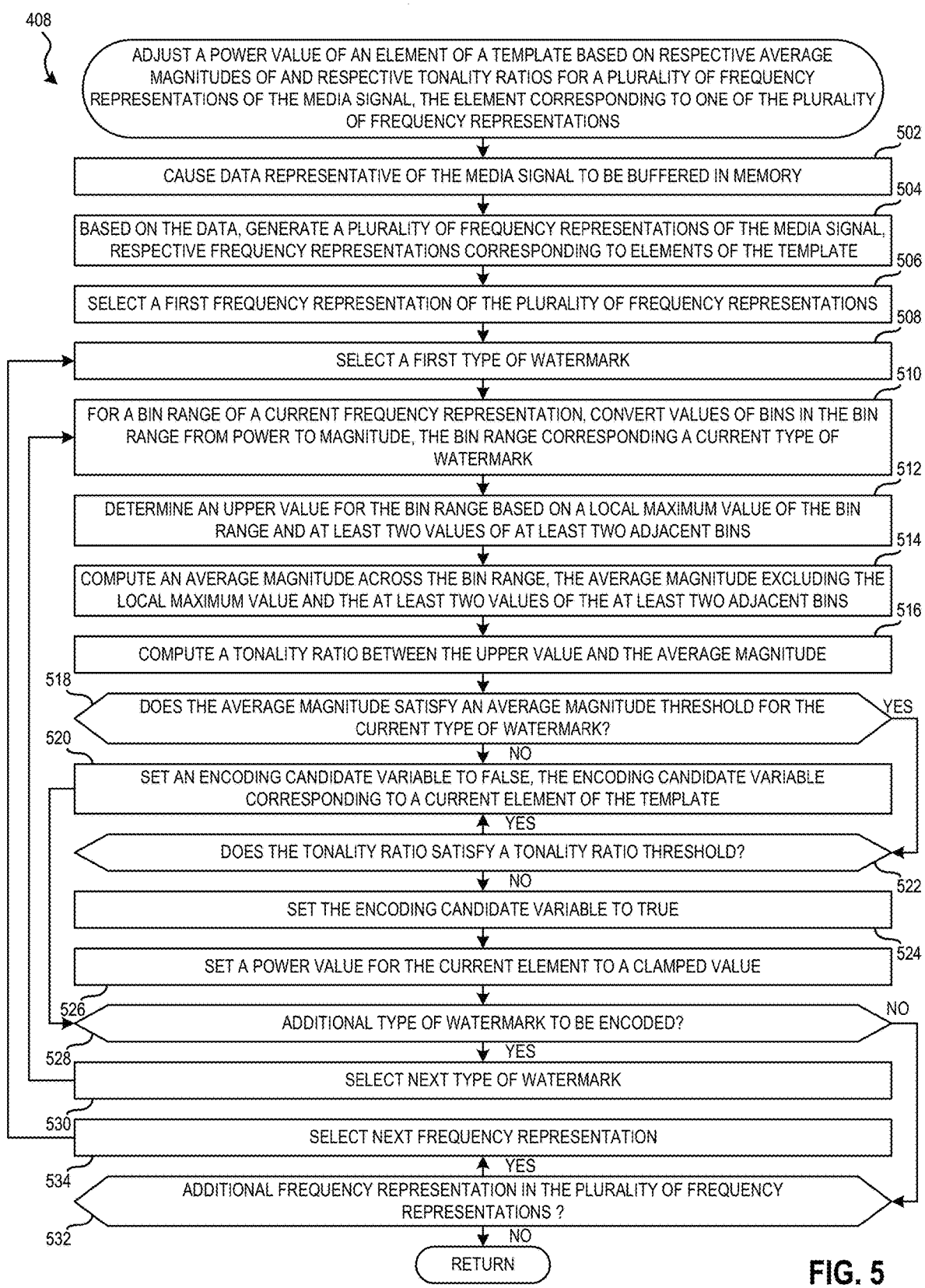
FIG. 5 is a flowchart representative of example machine readable instructions and/or example operations that may be executed and/or instantiated by processor circuitry to implement the example watermark encoder of FIGS. 1 and/or 2 to perform a power analysis on media.
Figure 6:
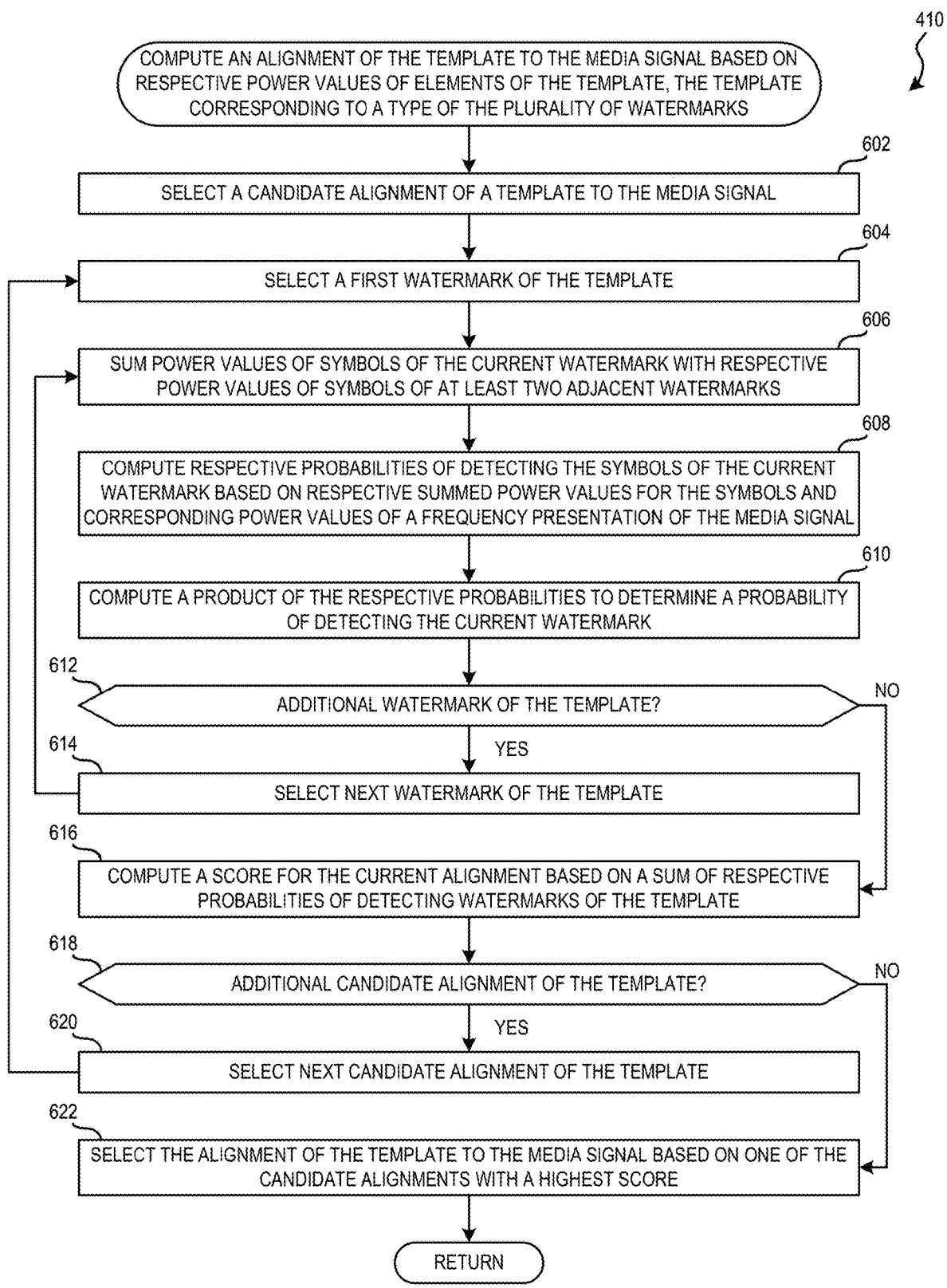
FIG. 6 is a flowchart representative of example machine readable instructions and/or example operations that may be executed and/or instantiated by processor circuitry to implement the example watermark encoder of FIGS. 1 and/or 2 to compute an alignment of a watermark template to media.

Flowcharts representative of example machine readable instructions, which may be executed to configure processor circuitry (e.g., the instructions cause processor circuitry) to implement the watermark encoder 102 of FIGS. 1 and/or 2, are shown in FIGS. 4, 5, and 6. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware.

The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. As such, it should be understood that examples disclosed herein may be implemented by at least one non-transitory computer readable storage medium comprising instructions, that, when executed, cause processor circuitry to perform the machine readable instructions and/or operations represented by the flowcharts illustrated in FIGS. 4, 5, and/or 6.

Further, although the example program is described with reference to the flowcharts illustrated in FIGS. 4, 5, and/or 6, many other methods of implementing the watermark encoder 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 4, 5, and/or 6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions and/or example operations 400 that may be executed and/or instantiated by processor circuitry to implement the example watermark encoder 102 of FIGS. 1 and/or 2. The machine readable instructions and/or the operations 400 of FIG. 4 begin at block 402, at which the encoding circuitry 204 determines a duration of media represented by a media signal. For example, at block 402, the I/O control circuitry 206 determines a duration of the media represented by the media signal. In the example of FIG. 2, the media signal is to be encoded with a plurality of watermarks.

In the illustrated example of FIG. 4, at block 404, the encoding circuitry 204 determines whether the duration of the media satisfies a first threshold corresponding to a lower bound of or floor for media durations for which watermark detection problems are unlikely. For example, at block 404, the I/O control circuitry 206 determines the duration of the media satisfies the first threshold. In the example of FIG. 4, the first threshold is set to 80 seconds. Additionally, in the example of FIG. 4, the I/O control circuitry 206 determines whether the duration of the media is greater than the first threshold.

In the illustrated example of FIG. 4, in response to the I/O control circuitry 206 determining that the duration of the media satisfies the first threshold (block 404: YES), the machine readable instructions and/or the operations 400 proceed to block 414. In response to the I/O control circuitry 206 determining that the duration of the media does not satisfy the first threshold (block 404: NO), the machine readable instructions and/or the operations 400 proceed to block 406. At block 406, the encoding circuitry 204 determines whether the duration of the media satisfies a second threshold corresponding to an upper bound of or ceiling for media durations for which improved detection of watermarks is feasible. For example, at block 406, the I/O control circuitry 206 determines whether the duration of the media satisfies the second threshold. In the example of FIG. 4, the second threshold is set to six seconds. Additionally, in the example of FIG. 4, the I/O control circuitry 206 determines whether the duration of the media is greater than the second threshold.

In the illustrated example of FIG. 4, in response to the I/O control circuitry 206 determining that the duration of the media does not satisfy the second threshold (block 406:

NO), the machine readable instructions and/or the operations 400 proceed to block 414. In response to the I/O control circuitry 206 determining that the duration of the media satisfies the second threshold (block 406: YES), the machine readable instructions and/or the operations 400 proceed to block 408. At block 408, the encoding circuitry 204 adjusts a power value of an element of a template based on respective average magnitudes of and respective tonality ratios for a plurality of frequency representations of the media signal. For example, at block 408, the signal power analysis circuitry 208 adjusts a power value of an element of a template based on respective average magnitudes of and respective tonality ratios for a plurality of frequency representations of the media signal. In the example of FIG. 4, the element of the watermark template corresponds to one of the plurality of frequency representations. Example machine readable instructions and/or the operations to implement block 408 are illustrated and described in connection with FIG. 5.

In the illustrated example of FIG. 4, at block 410, the encoding circuitry 204 computes an alignment of the template to the media signal based on respective power values of elements of the template. For example, at block 410, the template alignment circuitry 214 computes an alignment of the template to the media signal based on respective power values of elements of the template. In the example of FIG. 4, the template corresponds to a type of the plurality of watermarks to be encoded into the media signal. Example machine readable instructions and/or the operations to implement block 410 are illustrated and described in connection with FIG. 6.

In the illustrated example of FIG. 4, at block 412, the encoding circuitry 204 encodes the media signal with the plurality of watermarks according to the alignment (e.g., according to the selected alignment). For example, at block 412, the watermark encoder circuitry 220 encodes the media signal with the plurality of watermarks according to the alignment. In this manner, by executing and/or instantiating the machine readable instructions and/or the operations 400, the watermark encoder 102 performs a two pass encoding process for time alignment for watermarks to media (e.g., commercials). For example, the watermark encoder 102 performs time alignment analysis on the first pass (e.g., blocks 408 and 410). For example, on the first pass, the watermark encoder 102 analyzes commercial audio to determine an optimal watermark time alignment for increased (e.g., maximum) probability of acoustic detection. On the second pass (e.g., block 412), the watermark encoder 102 performs watermark encoding based on the time alignment analysis. In some examples, the watermark encoder 102 performs the first pass when the watermark encoder 102 sets up audio I/O and before initializing the encoding channels.

In the illustrated example of FIG. 4, at block 414, the encoding circuitry 204 performs standard encoding of the media signal with the plurality of watermarks. For example, at block 414, the watermark encoder circuitry 220 performs standard encoding of the media signal with the plurality of watermarks. At block 416, the transmission circuitry 202 transmits the encoded media signal to one or more devices. For example, the transmission circuitry 202 transmits the encoded media signal to one or more devices of the measurement location 104 via the network 108. Following block 416, the machine readable instructions and/or the operations 400 terminate. In some examples, processor circuitry executes and/or instantiates the machine readable instructions and/or the operations 400 in response to receiving additional media to be watermarked.

FIG. 5 is a flowchart representative of example machine readable instructions and/or example operations 408 that may be executed and/or instantiated by processor circuitry to implement the example watermark encoder 102 of FIGS. 1 and/or 2 to perform a power analysis on media. The machine readable instructions and/or the operations 408 of FIG. 5 begin at block 502, at which the signal processing circuitry 210 causes data representative of the media signal to be buffered in memory. For example, the signal processing circuitry 210 causes some or all of the media signal (e.g., an audio file) to be buffered in the datastore 222.

In the illustrated example of FIG. 5, at block 504, based on the data buffered in memory, the signal processing circuitry 210 generates a plurality of frequency representations of the media signal where respective frequency representations correspond to elements of the template. In the example of FIG. 5, at block 504, the signal processing circuitry 210 executes a plurality of 2048-point Blackman windowed FFTs with 50% overlap between individual FFTs. In the example of FIG. 5, the result of each FFT corresponds to an element (e.g., a slide) of the watermark template. At block 506, the signal processing circuitry 210 selects a first frequency representation of the plurality of frequency representations. At block 508, the signal processing circuitry 210 selects a first type of watermark represented in the plurality of watermarks to be encoded into the medial signal.

In the illustrated example of FIG. 5, at block 510, for a bin range of a current frequency representation, the signal processing circuitry 210 converts values of the bins in the bin range from power to magnitude. In the example of FIG. 5, the bin range corresponds to a current type of watermark. At block 512, the signal processing circuitry 210 determines an upper value for the bin range based on a local maximum value of the bin range and at least two values of at least two adjacent bins (e.g., one bin to the left and one bin to the right of the bin having the local maximum value). At block 514, the signal processing circuitry 210 computes an average magnitude across the bin range wherein the average magnitude excludes the local maximum value and the at least two values of the at least two adjacent bins. In the example of FIG. 5, at block 516, the signal processing circuitry 210 computes a tonality ratio between the upper value and the average magnitude across the bin range.

In the illustrated example of FIG. 5, at block 518, the comparator circuitry 212 compares the average magnitude of the bin range for the current frequency representation to an average magnitude threshold. For example, at block 518, the comparator circuitry 212 determines whether the average magnitude is greater than the average magnitude threshold. In the example of FIG. 5, the average magnitude threshold corresponds to a current type of watermark being evaluated. In the example of FIG. 5, in response to the comparator circuitry 212 determining that the average magnitude does not satisfy (e.g., is less than or equal to) the average magnitude threshold (block 518: NO), the machine readable instructions and/or the operations 408 proceed to block 520. At block 520, the comparator circuitry 212 sets an encoding candidate variable to false. For example, the encoding candidate variable corresponds to an element of the template that corresponds to the current frequency representation being evaluated. In response to the comparator circuitry 212 determining that the average magnitude satisfies (e.g., is greater than) the average magnitude threshold (block 518: YES), the machine readable instructions and/or the operations 408 proceed to block 522.

In the illustrated example of FIG. 5, at block 522, the comparator circuitry 212 determines whether the tonality ratio satisfies (e.g., is greater than or equal to) a tonality ratio threshold. In response to the comparator circuitry 212 determining that the tonality ratio satisfies (e.g., is greater than or equal to) the tonality ratio threshold (block 522: YES), the machine readable instructions and/or the operations 408 return to block 520. In response to the comparator circuitry 212 determining that the tonality ratio does not satisfy (e.g., is less than) the tonality ratio threshold (block 522: NO), the machine readable instructions and/or the operations 408 proceed to block 524. At block 524, the comparator circuitry 212 sets the encoding candidate variable to true. In the example of FIG. 5, at block 526, the comparator circuitry 212 sets a power value for the element of the template that corresponds to the current frequency representation being evaluated to a clamped power (e.g., a clamped CBET power for the CBET watermark template).

In the illustrated example of FIG. 5, at block 528, the signal processing circuitry 210 determines whether there is an additional type of watermark represented in the plurality of watermarks to be encoded into the medial signal. In response to the signal processing circuitry 210 determining that there is an additional type of watermark to be encoded (block 528: YES), the machine readable instructions and/or the operations 408 proceed to block 530. At block 530, the signal processing circuitry 210 selects a next type of watermark represented in the plurality of watermarks to be encoded into the media signal. In response to the signal processing circuitry 210 determining that there is not an additional type of watermark to be encoded (block 528: NO), the machine readable instructions and/or the operations 408 proceed to block 532.

In the illustrated example of FIG. 5, at block 532, the signal processing circuitry 210 determines whether there is an additional frequency representation in the plurality of frequency representations of the media signal. In response to the signal processing circuitry 210 determining that there is an additional frequency representation (block 532: YES), the machine readable instructions and/or the operations 408 proceed to block 534. At block 534, the signal processing circuitry 210 selects a next frequency representation of the plurality of frequency representations. In this manner, the signal processing circuitry 210 determines respective upper values for a bin range of each of the plurality of frequency representations of the media signal, computes respective average magnitudes across the bin range of each of the plurality of frequency representations, and computes respective tonality ratios for each of the plurality of frequency representations based on the respective upper values and the respective average magnitudes. In the example of FIG. 5, in response to the signal processing circuitry 210 determining that there is not an additional frequency representation (block 532: NO), the machine readable instructions and/or the operations 408 return to the machine readable instructions and/or the operations 400 at block 410.

FIG. 6 is a flowchart representative of example machine readable instructions and/or example operations 410 that may be executed and/or instantiated by processor circuitry to implement the example watermark encoder 102 of FIGS. 1 and/or 2 to compute an alignment of a watermark template to media. The machine readable instructions and/or the operations 410 of FIG. 6 begin at block 602, at which the alignment control circuitry 216 selects a candidate alignment of a watermark template to the media signal. At block 604, the alignment control circuitry 216 selects a first watermark of the template.

In the illustrated example of FIG. 6, at block 606, the score computation circuitry 218 sums power values of symbols of the current watermark with respective power values of symbols of at least two adjacent watermarks. For example, at block 606, the score computation circuitry 218 is to sum power values of first symbols of a first watermark of the template with respective power values of respective symbols of at least two adjacent watermarks of the template. At block 608, the score computation circuitry 218 computes respective probabilities of detecting the symbols of the current watermark based on respective summed power values for the symbols and corresponding power values of the frequency representation of the media signal. In the example of FIG. 5, by summing the symbol power values for the current watermark and two adjacent (e.g., nearby) watermarks, the score computation circuitry 218 increases the probability of detecting the current watermark being processed.

In the illustrated example of FIG. 6, at block 610, the score computation circuitry 218 computes a product of the respective probabilities of detecting the symbols of the current watermark to determine a probability of detecting the current watermark. At block 612, the alignment control circuitry 216 determines whether there is an additional watermark of the template. In response to the alignment control circuitry 216 determining that there is an additional watermark of the template (block 612: YES), the machine readable instructions and/or the operations 410 proceed to block 614. At block 614, the alignment control circuitry 216 selects a next watermark of the template.

In the illustrated example of FIG. 6, in response to the alignment control circuitry 216 determining that there is not an additional watermark of the template (block 612: NO), the machine readable instructions and/or the operations 410 proceed to block 616. At block 616, the score computation circuitry 218 computes a score for the current alignment based on the sum of respective probabilities of detecting watermarks of the template. At block 618, the alignment control circuitry 216 determines whether there is an additional candidate alignment of the template to the media signal. In response to the alignment control circuitry 216 determining that there is an additional candidate alignment of the template to the media signal (block 618: YES), the machine readable instructions and/or the operations 410 proceed to block 620. At block 620, the alignment control circuitry 216 selects a next candidate alignment of the template to the media signal.

In the illustrated example of FIG. 6, in response to the alignment control circuitry 216 determining that there is not an additional candidate alignment of the template to the media signal (block 618: NO), the machine readable instructions and/or the operations 410 proceed to block 622. At block 622, the alignment control circuitry 216 selects a candidate alignment that satisfies one or more criteria for encoding the plurality of watermarks into the media signal. For example, the alignment control circuitry 216 selects a candidate alignment with the highest score as the alignment for encoding the plurality of watermarks into the media signal. Following block 622, the machine readable instructions and/or the operations 410 return to the machine readable instructions and/or the operations 400 at block 412.

FIG. 7 is a block diagram of an example processor platform 700 structured to execute and/or instantiate the machine readable instructions and/or the operations of FIGS. 4, 5, and/or 6 to implement the watermark encoder 102 of FIGS. 1 and/or 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs, microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the example encoding circuitry 204, the example I/O control circuitry 206, the example signal power analysis circuitry 208, the example signal processing circuitry 210, the example comparator circuitry 212, the example template alignment circuitry 214, the example alignment control circuitry 216, the example score computation circuitry 218, and/or the watermark encoder circuitry 220.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc. In this example, the interface circuitry 720 implements the transmission circuitry 202.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the one or more mass storage devices 728 implements the datastore 222.

The machine executable instructions 732, which may be implemented by the machine readable instructions and/or the operations of FIGS. 4, 5, and/or 6, may be stored in the mass storage device 728, in the volatile memory 714, in the non-volatile memory 716, and/or on a removable non-transitory computer readable storage medium such as a CD or DVD.

Figure 8:
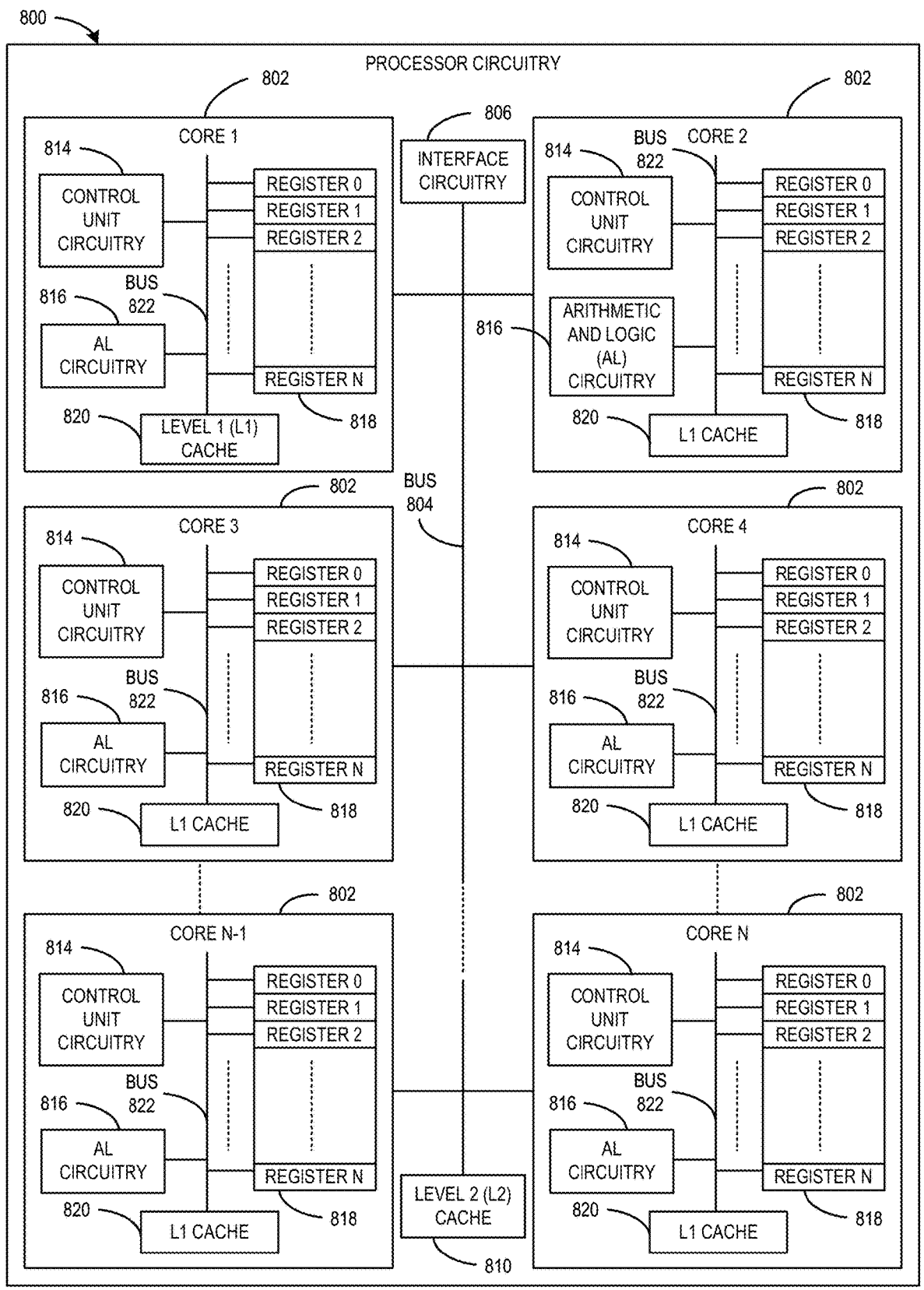
FIG. 8 is a block diagram of an example implementation of the processor circuitry of FIG. 7.

FIG. 8 is a block diagram of an example implementation of the processor circuitry 712 of FIG. 7. In this example, the processor circuitry 712 of FIG. 7 is implemented by a microprocessor 800. For example, the microprocessor 800 may be a general purpose microprocessor (e.g., general purpose microprocessor circuitry). The microprocessor 800 executes some or all of the machine readable instructions of the flowcharts of FIGS. 4, 5, and/or 6 to effectively instantiate the circuitry of FIG. 2 as logic circuits to perform the operations corresponding to those machine readable instructions. In some such examples, the circuitry of FIG. 2 is instantiated by the hardware circuits of the microprocessor 800 in combination with the instructions. For example, the microprocessor 800 may implement multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or the operations represented by the flowcharts of FIGS. 4, 5, and/or 6.

The cores 802 may communicate by a first example bus 804. In some examples, the first bus 804 may implement a communication bus to effectuate communication associated with one(s) of the cores 802. For example, the first bus 804 may be implemented by at least one of an Inter-Integrated Circuit (I2C) bus, a Serial Peripheral Interface (SPI) bus, a PCI bus, or a PCIe bus. Additionally or alternatively, the first bus 804 may be implemented by any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2 cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry 816 (sometimes referred to as an ALU), a plurality of registers 818, the local memory 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control data movement (e.g., coordinate data movement) within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The second bus 822 may be implemented by at least one of an I2C bus, a SPI bus, a PCI bus, or a PCIe bus.

Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

FIG. 9 is a block diagram of another example implementation of the processor circuitry 712 of FIG. 7. In this example, the processor circuitry 712 is implemented by FPGA circuitry 900. For example, the FPGA circuitry 900 may be implemented by an FPGA. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions and/or the operations represented by the flowcharts of FIGS. 4, 5, and/or 6 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions and/or the operations represented by the flowcharts of FIGS. 4, 5, and/or 6. In particular, the FPGA circuitry 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowcharts of FIGS. 4, 5, and/or 6. As such, the FPGA circuitry 900 may be structured to effectively instantiate some or all of the machine readable instructions and/or the operations of the flowcharts of FIGS. 4, 5, and/or 6 as dedicated logic circuits to perform the operations corresponding to those software instructions in a dedicated manner analogous to an ASIC. Therefore, the FPGA circuitry 900 may perform the operations corresponding to the some or all of the machine readable instructions and/or the operations of FIGS. 4, 5, and/or 6 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware 906 (e.g., external hardware circuitry). For example, the configuration circuitry 904 may implement interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may implement the microprocessor 800 of FIG. 8. The FPGA circuitry 900 also includes an array of example logic gate circuitry 908, a plurality of example configurable interconnections 910, and example storage circuitry 912. The logic gate circuitry 908 and configurable interconnections 910 are configurable to instantiate one or more operations that may correspond to at least some of the machine readable instructions and/or the operations of FIGS. 4, 5, and/or 6 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The configurable interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modern FPGA circuitry may include an onboard CPU, such as one or more of the example CPU 920 of FIG. 9. Therefore, the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions and/or the operations represented by the flowcharts of FIGS. 4, 5, and/or 6 may be executed by one or more of the cores 802 of FIG. 8, a second portion of the machine readable instructions and/or the operations represented by the flowcharts of FIGS. 4, 5, and/or 6 may be executed by the FPGA circuitry 900 of FIG. 9, and/or a third portion of the machine readable instructions and/or the operations represented by the flowcharts of FIGS. 4, 5, and/or 6 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 712 of FIG. 7 may be in one or more packages. For example, the microprocessor 800 of FIG. 8 and/or the FPGA circuitry 900 of FIG. 9 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

Figure 10:
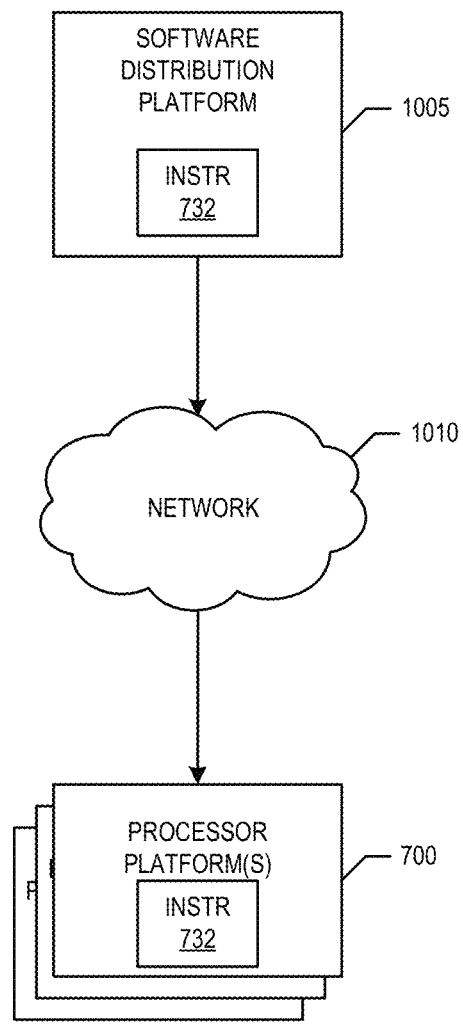
FIG. 10 is a block diagram of an example software distribution platform (e.g., one or more servers) to distribute software (e.g., software corresponding to example machine readable instructions of FIGS. 4, 5, and/or 6) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine readable instructions 732 of FIG. 7 to hardware devices owned and/or operated by third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine readable instructions 732 of FIG. 7. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the machine readable instructions 732, which may correspond to the example machine readable instructions and/or the example operations 400 of FIG. 4, the example machine readable instructions and/or the example operations 408 of FIG. 5, and/or the example machine readable instructions and/or the example operations 410 of FIG. 6, as described above. The one or more servers of the example software distribution platform 1005 are in communication with a network 1010, which may correspond to any one or more of the Internet and/or any of the example network 108 and/or the network 726 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 732 from the software distribution platform 1005. For example, the software, which may correspond to the example machine readable instructions and/or the example operations 400 of FIG. 4, the example machine readable instructions and/or the example operations 408 of FIG. 5, and/or the example machine readable instructions and/or the example operations 410 of FIG. 6, may be downloaded to the example processor platform 700, which is to execute the machine readable instructions 732 to implement the watermark encoder 102 of FIGS. 1 and/or 2. In some example, one or more servers of the software distribution platform 1005 periodically offer, transmit, and/or force updates to the software (e.g., the example machine readable instructions 732 of FIG. 7) to ensure improvements, patches, updates, etc., are distributed and applied to the software at the end user devices.

From the foregoing, it will be appreciated that example systems, methods, apparatus, and articles of manufacture have been disclosed that improve watermark detection in temporally short commercials via two-pass position time alignment. Example systems, methods, apparatus, and articles of manufacture have been disclosed that improve the effectiveness of detecting watermarks in media. Disclosed systems, methods, apparatus, and articles of manufacture improve the efficiency of using a computing device by reducing the processor resource consumption associated with attempting to detect watermarks that would not otherwise be detectable without examples disclosed herein. Disclosed systems, methods, apparatus, and articles of manufacture are accordingly directed to one or more improvement(s) in the operation of a machine such as a computer or other electronic and/or mechanical device.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to perform time alignment for watermarks, the apparatus comprising
memory;
machine readable instructions; and
one or more processors configured to:
adjust a power value of an element of a template based on respective average magnitudes and respective tonality ratios corresponding to a plurality of frequency representations of a media signal, the media signal to be encoded with at least one watermark, the element corresponding to one of the plurality of frequency representations;
compute an alignment of the template to the media signal based on respective power values of elements of the template, the template corresponding to a type of the at least one watermark; and
encode the media signal with the at least one watermark according to the alignment.

2. The apparatus of claim 1, wherein the one or more processors are configured to determine whether a duration of media represented by the media signal satisfies a threshold, the threshold corresponding to a lower bound of media durations for which watermark detection problems are unlikely.

3. The apparatus of claim 1, wherein the one or more processors are configured to determine whether a duration of media represented by the media signal satisfies a threshold, the threshold corresponding to an upper bound of media durations for which improved detection of watermarks is feasible.

4. The apparatus of claim 1, wherein to adjust the power value of the element of the template, the one or more processors are configured to:
determine respective upper values for a bin range of each of the plurality of frequency representations of the media signal, the bin range corresponding to the type of the at least one watermark;
compute the respective average magnitudes across the bin range, the respective average magnitudes excluding the respective upper values; and
compute the respective tonality ratios based on the respective upper values and the respective average magnitudes.

5. The apparatus of claim 1, wherein the one or more processors are configured to:
determine whether an average magnitude of the one of the plurality of frequency representations satisfies an average magnitude threshold, the average magnitude threshold corresponding to the type of the at least one watermark, the element corresponding to the one of the plurality of frequency representations;
determine whether a tonality ratio for the one of the plurality of frequency representations satisfies a tonality ratio threshold; and
in response to the average magnitude satisfying the average magnitude threshold and the tonality ratio not satisfying the tonality ratio threshold, adjust the power value of the element of the template.

6. The apparatus of claim 1, wherein the at least one watermark includes a plurality of watermarks, and to compute the alignment of the template to the media signal, the one or more processors are configured to compute respective scores for candidate alignments of the template to the media signal based on respective sums of probabilities of detecting ones of the plurality of watermarks of the template.

7. The apparatus of claim 6, wherein to determine the probabilities of detecting the ones of the plurality of watermarks of the template, the one or more processors are configured to:
sum power values of first symbols of a first watermark of the template with respective power values of respective symbols of at least two adjacent watermarks of the template;
compute respective probabilities of detecting the first symbols based on respective summed power values for the first symbols and corresponding power values of the media signal; and
compute a product of the respective probabilities to determine a probability of detecting the first watermark.

8. At least one non-transitory computer readable storage medium comprising instructions, that, when executed, cause a computing system to:
adjust a power value of an element of a template based on respective average magnitudes and respective tonality ratios corresponding to a plurality of frequency representations of a media signal, the media signal to be encoded with at least one watermark, the element corresponding to one of the plurality of frequency representations;
compute an alignment of the template to the media signal based on respective power values of elements of the template, the template corresponding to a type of the at least one watermark; and encode the media signal with the at least one watermark according to the alignment.

9. The at least one non-transitory computer readable storage medium of claim 8, wherein the instructions cause the computing system to determine whether a duration of media represented by the media signal satisfies a threshold, the threshold corresponding to a lower bound of media durations for which watermark detection problems are unlikely.

10. The at least one non-transitory computer readable storage medium of claim 8, wherein the instructions cause the computing system to determine whether a duration of media represented by the media signal satisfies a threshold, the threshold corresponding to an upper bound of media durations for which improved detection of watermarks is feasible.

11. The at least one non-transitory computer readable storage medium of claim 8, wherein to adjust the power value of the element of the template, the instructions cause the computing system to:
   determine respective upper values for a bin range of each of the plurality of frequency representations of the media signal, the bin range corresponding to the type of the at least one watermark;
   compute the respective average magnitudes across the bin range, the respective average magnitudes excluding the respective upper values; and
   compute the respective tonality ratios based on the respective upper values and the respective average magnitudes.

12. The at least one non-transitory computer readable storage medium of claim 8, wherein the instructions cause the computing system to:
   determine whether an average magnitude of the one of the plurality of frequency representations satisfies an average magnitude threshold, the average magnitude threshold corresponding to the type of the at least one watermark, the element corresponding to the one of the plurality of frequency representations;
   determine whether a tonality ratio for the one of the plurality of frequency representations satisfies a tonality ratio threshold; and
   in response to the average magnitude satisfying the average magnitude threshold and the tonality ratio not satisfying the tonality ratio threshold, adjust the power value of the element of the template.

13. The at least one non-transitory computer readable storage medium of claim 8, wherein the at least one watermark includes a plurality of watermarks, and to compute the alignment of the template to the media signal, the instructions cause the computing system to compute respective scores for candidate alignments of the template to the media signal based on respective sums of probabilities of detecting ones of the plurality of watermarks of the template.

14. The at least one non-transitory computer readable storage medium of claim 13, wherein to determine the probabilities of detecting the ones of the plurality of watermarks of the template, the instructions cause the computing system to:
   sum power values of first symbols of a first watermark of the template with respective power values of respective symbols of at least two adjacent watermarks of the template;
   compute respective probabilities of detecting the first symbols based on respective summed power values for the first symbols and corresponding power values of the media signal; and compute a product of the respective probabilities to determine a probability of detecting the first watermark.

15. A method for performing time alignment for watermarks, the method comprising:
   adjusting, by one or more processors, a power value of an element of a template based on respective average magnitudes and respective tonality ratios corresponding to a plurality of frequency representations of a media signal, the media signal to be encoded with at least one watermark, the element corresponding to one of the plurality of frequency representations;
   computing, by the one or more processors, an alignment of the template to the media signal based on respective power values of elements of the template, the template corresponding to a type of the at least one watermark; and
   encoding the media signal with the at least one watermark according to the alignment.

16. The method of claim 15, further including determining whether a duration of media represented by the media signal satisfies a threshold, the threshold corresponding to a lower bound of media durations for which watermark detection problems are unlikely.

17. The method of claim 15, further including determining whether a duration of media represented by the media signal satisfies a threshold, the threshold corresponding to an upper bound of media durations for which improved detection of watermarks is feasible.

18. The method of claim 15, wherein adjusting the power value of the element of the template includes:
   determining respective upper values for a bin range of each of the plurality of frequency representations of the media signal, the bin range corresponding to the type of the at least one watermark;
   computing the respective average magnitudes across the bin range, the respective average magnitudes excluding the respective upper values; and
   computing the respective tonality ratios based on the respective upper values and the respective average magnitudes.

19. The method of claim 15, further including:
   determining whether an average magnitude of the one of the plurality of frequency representations satisfies an average magnitude threshold, the average magnitude threshold corresponding to the type of the at least one watermark, the element corresponding to the one of the plurality of frequency representations;
   determining whether a tonality ratio for the one of the plurality of frequency representations satisfies a tonality ratio threshold; and
   in response to the average magnitude satisfying the average magnitude threshold and the tonality ratio not satisfying the tonality ratio threshold, adjusting the power value of the element of the template.

20. The method of claim 15, wherein the at least one watermark includes a plurality of watermarks, and computing the alignment of the template to the media signal includes computing respective scores for candidate alignments of the template to the media signal based on respective sums of probabilities of detecting ones of the plurality of watermarks of the template.

21. The method of claim 20, wherein determining the probabilities of detecting the ones of the plurality of watermarks of the template includes:

summing power values of first symbols of a first watermark of the template with respective power values of respective symbols of at least two adjacent watermarks of the template;

computing respective probabilities of detecting the first symbols based on respective summed power values for the first symbols and corresponding power values of the media signal; and computing a product of the respective probabilities to determine a probability of detecting the first watermark.

* * * * *